United States Patent
Fujikawa

(10) Patent No.: US 10,606,141 B2
(45) Date of Patent: Mar. 31, 2020

(54) ELECTROOPTICAL DEVICE AND ELECTRONIC APPARATUS

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/972,877

(22) Filed: May 7, 2018

(65) Prior Publication Data
US 2018/0335658 A1    Nov. 22, 2018

(30) Foreign Application Priority Data

May 17, 2017    (JP) .................................. 2017-097933

(51) Int. Cl.
| | |
|---|---|
| *G02F 1/1368* | (2006.01) |
| *G02F 1/1362* | (2006.01) |
| *G01K 7/01* | (2006.01) |
| *G02F 1/1333* | (2006.01) |

(52) U.S. Cl.
CPC ............. *G02F 1/1368* (2013.01); *G01K 7/01* (2013.01); *G02F 1/13338* (2013.01); *G02F 1/136209* (2013.01); *G02F 1/136286* (2013.01); *G02F 2001/133388* (2013.01); *G02F 2001/136254* (2013.01)

(58) Field of Classification Search
CPC .................................................... G02F 1/1368
See application file for complete search history.

(56) References Cited

U.S. PATENT DOCUMENTS

| | | | |
|---|---|---|---|
| 5,736,769 A | * | 4/1998 | Nishiura ............. H01L 27/0248 257/140 |
| 6,414,740 B1 | | 7/2002 | Hosoyamada |
| 2003/0174271 A1 | * | 9/2003 | Fujikawa ............. G02F 1/1345 349/149 |
| 2005/0122305 A1 | | 6/2005 | Murao et al. |
| 2006/0061406 A1 | * | 3/2006 | Takatori ................... G01K 1/14 327/350 |
| 2007/0028390 A1 | | 2/2007 | Moriwaki et al. |
| 2007/0080282 A1 | | 4/2007 | Fann |
| 2008/0278667 A1 | | 11/2008 | Kobashi |

(Continued)

FOREIGN PATENT DOCUMENTS

| | | |
|---|---|---|
| JP | H08-29265 A | 2/1996 |
| JP | 2000-009547 A | 1/2000 |

(Continued)

*Primary Examiner* — Edmond C Lau
(74) *Attorney, Agent, or Firm* — Oliff PLC

(57) ABSTRACT

In an electrooptical device, a plurality of scanning lines extend between a first side of a display region and a scanning line driving circuit. A semiconductor sensor is provided between the scanning line driving circuit and the first side of the display region, the semiconductor sensor including a sensor semiconductor layer which is on the same layer as a semiconductor layer of a pixel transistor. The semiconductor sensor is a diode temperature sensor, and includes a plurality of diode elements (sensor elements) that are disposed along the first side of the display region and electrodes that electrically connect the plurality of diode elements.

17 Claims, 21 Drawing Sheets

(56) References Cited

U.S. PATENT DOCUMENTS

| | | | |
|---|---|---|---|
| 2009/0102774 A1* | 4/2009 | Hattori | G02F 1/133382 |
| | | | 345/92 |
| 2009/0179243 A1 | 7/2009 | Fann | |
| 2011/0069038 A1 | 3/2011 | Fann et al. | |
| 2012/0183011 A1 | 7/2012 | Fujikawa | |
| 2016/0011058 A1* | 1/2016 | Kiep | G01K 7/01 |
| | | | 374/178 |

FOREIGN PATENT DOCUMENTS

| | | |
|---|---|---|
| JP | 2000-089197 A | 3/2000 |
| JP | 2000-338518 A | 12/2000 |
| JP | 2002-357812 A | 12/2002 |
| JP | 2003-043440 A | 2/2003 |
| JP | 2006-227340 A | 8/2006 |
| JP | 2008-11870 A | 5/2008 |
| JP | 4094536 B2 | 6/2008 |
| JP | 2008-304900 A | 12/2008 |
| JP | 2009-103780 A | 5/2009 |
| JP | 2012-98732 A | 5/2012 |
| JP | 2012-141360 A | 7/2012 |
| JP | 2012-145793 A | 8/2012 |
| JP | 2012-194038 A | 10/2012 |
| JP | 2012-198378 A | 10/2012 |

* cited by examiner

ELECTROOPTICAL DEVICE AND ELECTRONIC APPARATUS

BACKGROUND

1. Technical Field

The present invention relates to an electrooptical device in which a semiconductor sensor is provided and an electronic apparatus.

2. Related Art

An electrooptical device such as a liquid crystal device includes a first substrate on which a pixel transistor and a pixel electrode are provided in a display region, a second substrate on which a common electrode facing the pixel electrode is provided, and an electrooptical layer which is provided between the first substrate and the second substrate, and drives the electrooptical layer between the pixel electrode and the common electrode. A parting light shielding layer is formed in a frame-shaped region on the second substrate that extends along a space between an outer edge of the display region and a sealing member. In the electrooptical device configured as described above, light-source light incident from the second substrate is modulated, and thus an image is displayed.

In the electrooptical device, a temperature of the electrooptical layer rises due to irradiation of the light-source light. As a result, display performance and a lifetime of the electrooptical device may decrease in some cases. For this reason, a technique for providing a resistance wire or the like as a temperature sensor on the first substrate and monitoring the temperature of the electrooptical layer or the like has been proposed (refer to JP-A-2009-103780). In JP-A-2009-103780, a structure in which a resistance wire (temperature sensor) is disposed along the outer edge of the display region has been proposed.

In order to detect the temperature or the like of the electrooptical layer with high sensitivity, it is necessary to dispose a large-sized semiconductor sensor having a large area near the display region. However, in an outer circumference region of the display region, a signal output circuit such as a data line driving circuit is provided near the display region, and signal lines such as scanning lines extend from the signal output circuit toward the display region. For this reason, it is difficult to provide a large-sized semiconductor sensor between the display region and the signal output circuit such as the data line driving circuit.

SUMMARY

An advantage of some aspects of the invention is to provide an electrooptical device in which a semiconductor sensor with high sensitivity can be provided at a position close to a display region and an electronic apparatus.

According to an aspect of the invention, there is provided an electrooptical device including: a plurality of first signal lines that extend in a first direction within a display region on one surface of a first substrate; a plurality of second signal lines that extend in a second direction intersecting with the first direction within the display region on the one surface of the first substrate; pixel electrodes that are provided corresponding to intersections between the first signal lines and the second signal lines on the one surface of the first substrate; and a semiconductor sensor that is provided on the one surface of the first substrate, in which the semiconductor sensor includes a plurality of sensor elements disposed along at least one side of the display region and electrodes for electrically connecting the plurality of sensor elements.

In the electrooptical device, the semiconductor sensor is provided along a side of the display region, and thus the semiconductor sensor and the display region are close to each other. Therefore, a temperature or the like of the display region can be properly monitored by the semiconductor sensor. In addition, since the plurality of first signal lines or the plurality of second signal lines extend in a region along a side of the display region, it is difficult to provide a large-sized semiconductor sensor. On the other hand, in the electrooptical device, the semiconductor sensor is divided into the plurality of sensor elements, and the plurality of sensor elements are disposed along a side of the display region so as to be electrically connected to each other. Therefore, the semiconductor sensor has high sensitivity equivalent to that of a large-sized semiconductor sensor.

The electrooptical device may employ a configuration in which the plurality of sensor elements are provided at an interval of n times (n is an integer of one or more) any one of a wiring pitch of the first signal lines, a wiring pitch of the second signal lines, and a pitch of the pixel electrodes. In this configuration, the sensor elements can be disposed in the region along a side of the display region so as to avoid the plurality of first signal lines and the plurality of second signal lines.

The electrooptical device may employ a configuration in which dummy elements are provided at least one side of the display region, the dummy elements being formed by excluding a part of components of the plurality of sensor elements. In this configuration, a local unevenness difference due to presence or absence of the sensor element hardly occurs. In order to realize a good display performance, it is important to flatten the display region. For efficient flattening of the display region, it is necessary to prevent a local extreme stepped portion in a region around the display region. In the electrooptical device, flatness of the region around the display region is unlikely to be fluctuated by the formation of the dummy elements, and thus a display defect hardly occurs. In addition, a degree of fineness of a wiring pattern is maintained, and thus a configuration suitable for microfabrication is obtained.

The electrooptical device may employ a configuration in which the semiconductor sensor is a diode temperature sensor, and in which each of the plurality of sensor elements is a diode element connected by the electrode.

The electrooptical device may employ a configuration in which the semiconductor sensor is disposed along at least a side positioned on one side of the display region in the first direction, and in which the first signal line does not overlap with the diode element in a plan view. In this configuration, electrical interference hardly occurs between the first signal line and the diode element. The electrooptical device may employ a configuration in which the semiconductor sensor is disposed along at least a side positioned on one side of the display region in the first direction, in which a part of the first signal line overlaps with the diode element in a plan view, in which a transistor is formed on the first substrate, the transistor including a sensor semiconductor layer which is on the same layer as a semiconductor layer constituting the diode element, and in which a part of the first signal line is configured with a conduction layer other than a conduction layer constituting a gate electrode disposed on a gate insulation layer in the transistor. In this configuration, electrical interference hardly occurs between the first signal line and the diode element.

The electrooptical device may further include a second substrate facing the one surface of the first substrate; and an electrooptical layer provided between the first substrate and the second substrate, and may employ a configuration in which a light shielding layer which is formed so as to surround the display region and a transparent portion which overlaps with the semiconductor sensor in a plan view are provided on a side of the second substrate that is opposite to the semiconductor sensor. In this configuration, the electrooptical layer in a portion overlapping with the semiconductor sensor in a plan view is also irradiated with light-source light via the transparent portion. Thus, a difference between a temperature of the electrooptical layer of the display region and a temperature of the electrooptical layer in the portion overlapping with the semiconductor sensor in a plan view is small. Therefore, in a monitoring result by the temperature sensor, a deviation between the temperature of the electrooptical layer of the display region and the temperature of the electrooptical layer in the portion overlapping with the semiconductor sensor in a plan view is small.

The electrooptical device may employ a configuration in which the first signal line is a scanning line and in which the second signal line is a data line.

A liquid crystal device to which the invention is applied can be used for various electronic apparatuses such as a direct-viewing type display apparatus or a projection type display apparatus. In a case where the electronic apparatus is a projection type display apparatus, the projection type display apparatus includes a light source unit that emits light to be supplied to the liquid crystal device, and a projection optical system that projects light modulated by the liquid crystal device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
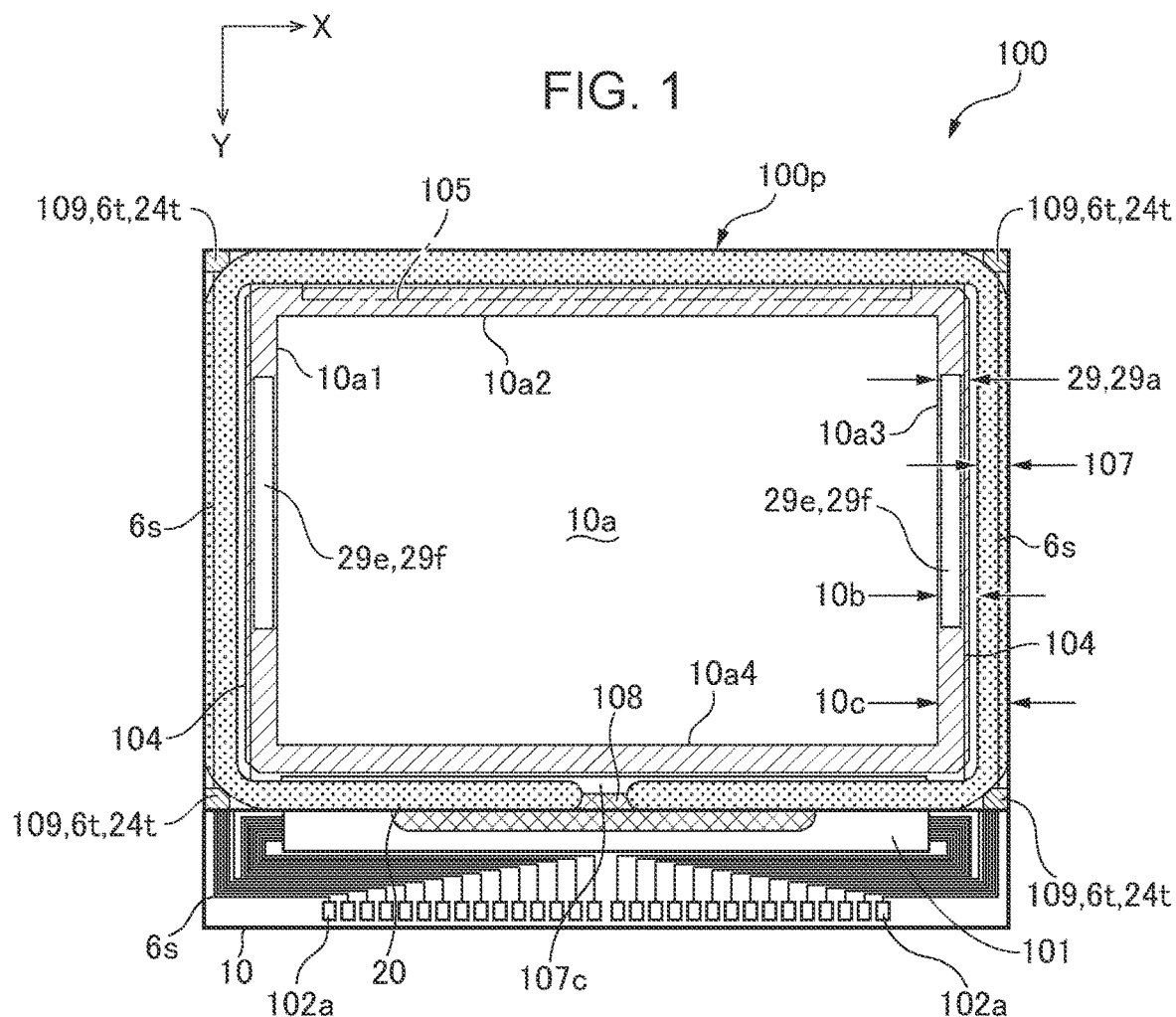
FIG. 1 is a plan view illustrating a configuration example of an electrooptical device according to a first embodiment of the invention.

Embodiments of the invention will be described with reference to the drawings. In the drawings referred to in the following description, in order to make each layer and each member to be recognizable on the drawings, each layer and each member are illustrated at different scales. In addition, when describing a layer formed on a first substrate, an upper side or a front surface side means an opposite side of a substrate main body of the first substrate (a side on which a counter substrate and a liquid crystal layer are positioned), and a lower side means a side on which the substrate main body of the first substrate is positioned. When describing a layer formed on a second substrate, an upper side or a front surface side means an opposite side of a substrate main body of a counter substrate (a side on which the first substrate and a liquid crystal layer are positioned), and a lower side means a side on which the substrate main body of the second substrate is positioned. In addition, in the invention, "in a plan view" means a view seen from a direction normal to the first substrate 10 or the second substrate 20.

First Embodiment

Specific Configuration of Electrooptical Device 100

Figure 2:
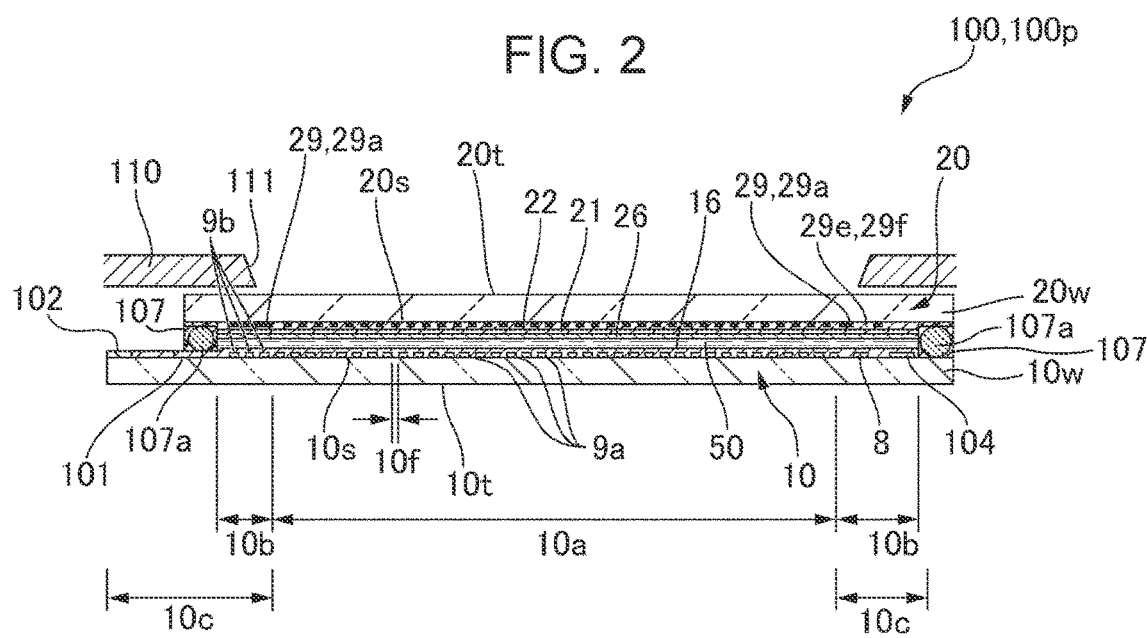
FIG. 2 is an explanatory view schematically illustrating a section of the electrooptical device illustrated in FIG. 1.

FIG. 1 is a plan view illustrating a configuration example of an electrooptical device 100 according to a first embodiment of the invention. FIG. 2 is an explanatory view schematically illustrating a section of the electrooptical device 100 illustrated in FIG. 1. The electrooptical device 100 illustrated in FIGS. 1 and 2 is a liquid crystal device, and includes a liquid crystal panel 100p. In the electrooptical device 100, a first substrate 10 and a second substrate 20 are bonded to each other by a sealing member 107 via a predetermined gap, and the sealing member 107 is provided in a frame shape along an outer edge of the second substrate 20. The sealing member 107 is an adhesive made of a photo-curable resin, a thermosetting resin, or the like, and a gap material 107a such as a glass fiber or a glass bead for keeping a distance between both substrates to a predetermined value is blended into the sealing member 107. In the liquid crystal panel 100p, an electrooptical layer 50 is provided in a region between the first substrate 10 and the second substrate 20 that is surrounded by the sealing member 107. A discontinued portion 107c which is used as an injection port of a liquid crystal material is formed on the sealing member 107, and the discontinued portion 107c is blocked by a sealant 108 after injection of the liquid crystal material. In a case where the liquid crystal material is enclosed by a dropping method, the discontinued portion 107c is not formed. Both of the first substrate 10 and the second substrate 20 have a quadrangular shape, and a display region 10a as a quadrangular region is provided at the substantial center of the electrooptical device 100. The sealing member 107 is also provided in a substantially quadrangular shape corresponding to the shape of the display region 10a, and an outer circumference region 10c having a quadrangular frame shape is provided outside the display region 10a.

A scanning line driving circuit 104 (first circuit) is formed on the first substrate 10 in the outer circumference region 10c so as to extend along a first side 10a1 positioned in a first direction X of the display region 10a. A plurality of terminals 102 are formed on an end portion of the first substrate 10 on a side extending in a second direction Y from the second substrate 20, and an inspection circuit 105 (second circuit) is provided in the outer circumference region 10c so as to extend along a second side opposite to the terminals 102 in the second direction Y of the display region 10a. In addition, a scanning line driving circuit 104 is formed on the first substrate 10 in the outer circumference region 10c so as to extend along a third side 10a3 facing the first side 10a1 in the first direction X. Further, a data line driving circuit 101 is formed on the first substrate 10 in the outer circumference region 10c so as to extend along a fourth side 10a4 facing the second side 10a2 in the second direction Y.

The first substrate 10 includes a transparent substrate main body 10w such as a quartz substrate or a glass substrate. A plurality of pixel transistors and pixel electrodes 9a which are electrically connected to each of the plurality of pixel transistors are formed in a matrix shape in the display region 10a on one surface 10s of the first substrate 10 facing the second substrate 20, among the one surface 10s and the other surface 10t of the first substrate 10 (substrate main body 10w). A first alignment film 16 is formed on an upper side of the pixel electrodes 9a. On the one surface 10s of the first substrate 10 in a quadrangular-frame-shaped region 10b of the outer circumference region 10c that extends along a space between an outer edge of the display region 10a and the sealing member 107, dummy pixel electrodes 9b are formed on a portion extending along a side of the display region 10a together with the pixel electrodes 9a.

The second substrate 20 includes a transparent substrate main body 20w such as a quartz substrate or a glass substrate. A common electrode 21 is formed on one surface 20s of the second substrate 20 facing the first substrate 10 among the one surface 20s and the other surface 20t of the second substrate 20 (substrate main body 20w). The common electrode 21 is formed on the substantially entire surface of the second substrate 20 or on a region in which a plurality of strip-shaped electrodes are formed across a plurality of pixels 100a. In the present embodiment, the common electrode 21 is formed on the substantially entire surface of the second substrate 20.

On the one surface 20s of the second substrate 20 in the frame-shaped region 10b, a light shielding layer 29 is formed on a lower side of the common electrode 21, and a second alignment film 26 is stacked on a front surface of the common electrode 21 on the electrooptical layer 50 side. A transparent flattening film 22 is formed between the light shielding layer 29 and the common electrode 21. The light shielding layer 29 is formed as a parting light shielding layer 29a extending along the frame-shaped region 10b, and the display region 10a is defined by an inner edge of the parting light shielding layer 29a. The light shielding layer 29 is also formed as a black matrix portion 29b overlapping with an inter-pixel region 10f interposed between adjacent pixel electrodes 9a. The parting light shielding layer 29a is formed at a position overlapping with the dummy pixel electrode 9b in a plan view, and an outer circumference edge of the parting light shielding layer 29a is positioned at a position separated from an inner circumference edge of the sealing member 107 by a gap. Therefore, the parting light shielding layer 29a and the sealing member 107 do not overlap with each other. The parting light shielding layer 29a (light shielding layer 29) is made of a metal film or a black resin having a light shielding property.

The first alignment film 16 and the second alignment film 26 are inorganic alignment films made of an oblique vapor deposition film such as $SiO_X$ ($x \le 2$), $TiO_2$, MgO, or $Al_2O_3$, and a columnar-shaped body called as a column is made of a columnar-shaped structure layer which is formed obliquely with respect to the first substrate 10 and the second substrate 20. Therefore, the first alignment film 16 and the second alignment film 26 are formed such that nematic liquid crystal molecules having negative dielectric anisotropy are obliquely aligned with respect to the first substrate 10 and the second substrate 20 and the liquid crystal molecules are pretilted, the nematic liquid crystal molecules being used in the electrooptical layer 50. In this manner, the electrooptical device 100 is configured as a liquid crystal device with a normally-black vertical alignment (VA) mode.

In the electrooptical device 100, inter-substrate conduction electrode portions 24t are formed at four corner portions on the one surface 20s of the second substrate 20 that are positioned outside the sealing member 107, and inter-substrate conduction electrode portions 6t are formed at positions on the one surface 10s of the first substrate 10 that face the four corner portions (inter-substrate conduction electrode portions 24t) of the second substrate 20. The inter-substrate conduction electrode portion 6t is conducted to a common potential line 6s, and the common potential line 6s is conducted to a common potential supply terminal 102a among the terminals 102. An inter-substrate conduction member 109 including conductive particles is disposed between the inter-substrate conduction electrode portion 6t and the inter-substrate conduction electrode portion 24t, and the common electrode 21 of the second substrate 20 is electrically connected to the first substrate 10 via the inter-substrate conduction electrode portion 6t, the inter-substrate conduction member 109, and the inter-substrate conduction electrode portion 24t. Therefore, a common potential is applied to the common electrode 21 from the first substrate 10.

The electrooptical device 100 according to the present embodiment is a transmission type liquid crystal device. Therefore, the pixel electrode 9a and the common electrode 21 are formed of a transparent conduction film such as an indium tin oxide (ITO) film or an indium zinc oxide (IZO) film. In the electrooptical device 100 (transmission type liquid crystal device), light-source light L incident from the second substrate 20 is modulated while being emitted from the first substrate 10, and thus an image is displayed.

The electrooptical device 100 can be used as a color display device of an electronic apparatus such as a mobile computer or a mobile phone, and in this case, a color filter (not illustrated) is formed on the second substrate 20 or the first substrate 10. In addition, the electrooptical device 100 can be used as a RGB light bulb in a projection type display apparatus (liquid crystal projector) to be described. In this case, each color light which is decomposed via, for example, a dichroic mirror for RGB color decomposition is incident on each RGB electrooptical device 100, as projection light, respectively. Thus, a color filter is not formed.

Configuration of Transparent Portion 29e

In a portion of the frame-shaped region 10b outside the display region 10a that is positioned between the scanning line driving circuit 104 and the first side 10a1 of the display region 10a, a transparent portion 29e having a transparency higher than that of the parting light shielding layer 29a is formed so as to extend along the first side 10a1. The transparent portion 29e is configured with an opening portion 29f formed on the light shielding layer 29 (parting light shielding layer 29a). In the present embodiment, in a portion that is positioned between the scanning line driving circuit 104 and the third side 10a3 of the display region 10a, a transparent portion 29e having a transparency higher than that of the parting light shielding layer 29a is also formed so as to extend along the third side 10a3.

When mounting the electrooptical device 100 on a projection type display apparatus or the like, the electrooptical device 100 includes a holder (not illustrated) provided with a frame-shaped plate portion 110 for covering the outer circumference region 10c of the liquid crystal panel 100p from the second substrate 20. Here, an inner edge 111 of the plate portion 110 is positioned slightly outside a position overlapping with the inner edge of the parting light shielding layer 29a. Therefore, a part of the light-source light L is incident on the transparent portion 29e. In addition, in a case where the plate portion 110 is disposed so as to completely cover the parting light shielding layer 29a, a transparent window is formed at a position at which the plate portion 110 overlaps with the transparent portion 29e in a plan view.

Electrical Configuration of Electrooptical Device 100

Figure 3:
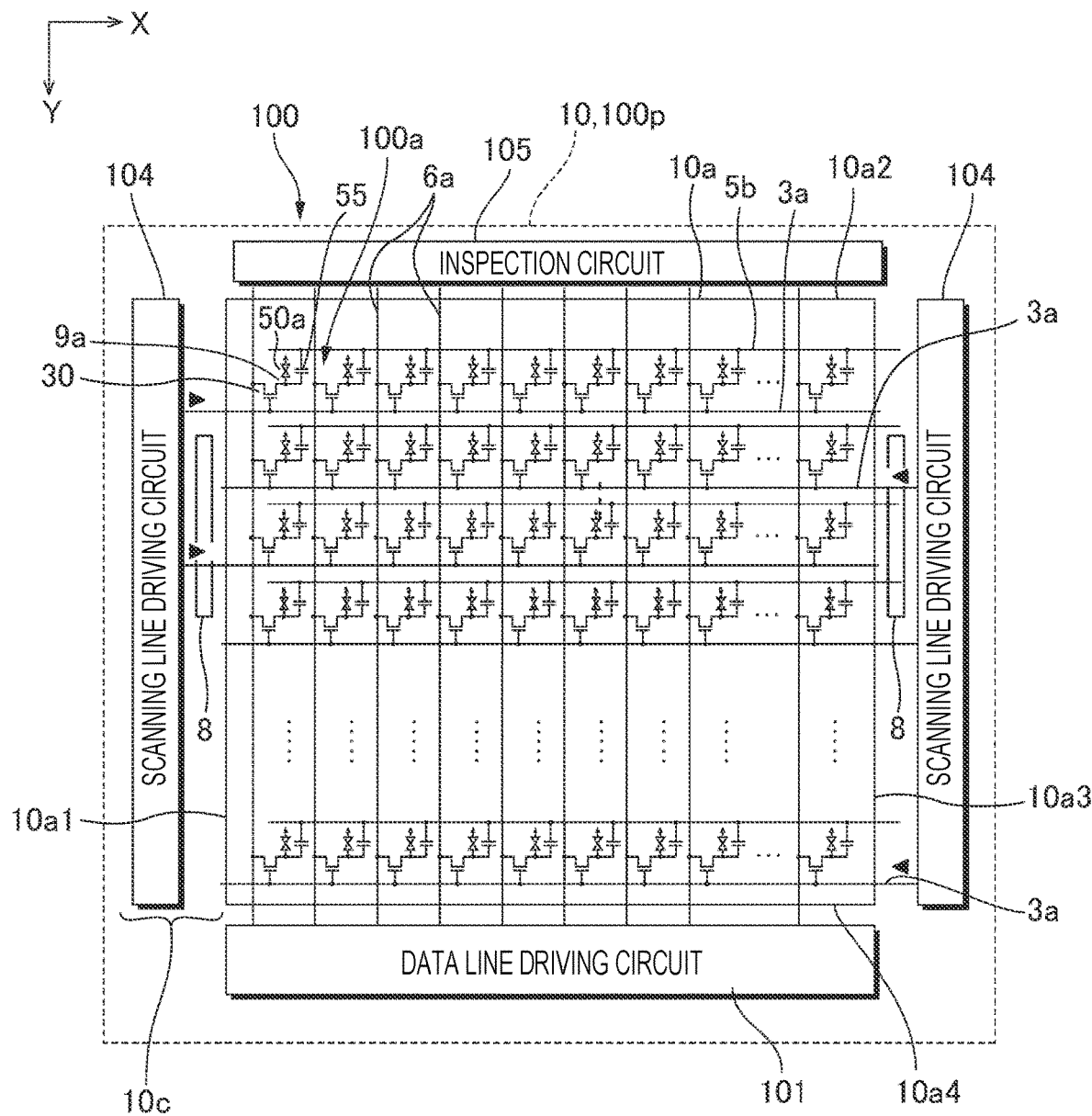
FIG. 3 is a block diagram illustrating an electrical configuration of the electrooptical device illustrated in FIG. 1.

FIG. 3 is a block diagram illustrating an electrical configuration of the electrooptical device 100 illustrated in FIG. 1. In FIG. 3, the electrooptical device 100 includes a liquid crystal panel 100p with a VA mode, and the liquid crystal panel 100p includes the display region 10a in which the plurality of pixels 100a are arranged in a matrix shape at the central region of the display region 10a. On the first substrate 10 in the liquid crystal panel 100p that is described with reference to FIGS. 1 and 2 and the like, a plurality of scanning lines 3a (first signal lines) connected to the scanning line driving circuit 104 and a plurality of data lines 6a (second signal lines) connected to the data line driving circuit 101 are respectively disposed inside the display region 10a so as to extend in the first direction X and the second direction Y, and the pixels 100a are formed at positions corresponding to intersections between the scanning lines 3a and the data lines 6a. In addition, the inspection circuit 105 is electrically connected to the plurality of data lines 6a on an opposite side of the data line driving circuit 101 in the second direction Y. In each of the plurality of pixels 100a, a pixel transistor 30 configured with a field effect transistor and a pixel electrode 9a electrically connected to the pixel transistor 30 are formed. The data line 6a is electrically connected to a source of the pixel transistor 30, the scanning line 3a is electrically connected to a gate of the pixel transistor 30, and the pixel electrode 9a is electrically connected to a drain of the pixel transistor 30. An image signal is supplied to the data line 6a, and a scanning signal is supplied to the scanning line 3a.

In each of the pixels 100a, the pixel electrode 9a faces the common electrode 21 of the second substrate 20 described with reference to FIGS. 1 and 2 via the electrooptical layer 50 interposed therebetween, and thereby forming a liquid crystal capacitance 50a. In each of the pixels 100a, a storage capacitor 55 is added in parallel with the liquid crystal capacitance in order to prevent a fluctuation in the image signal held by the liquid crystal capacitance. In the present embodiment, in order to form the storage capacitor 55, a capacitor line 5b extending across the plurality of pixels 100a is formed on the first substrate 10, and a common potential is supplied to the capacitor line 5b. In the present embodiment, the capacitor line 5b extends along the scanning line 3a in the first direction X.

Specific Configuration of Pixel 100a

Figure 4:
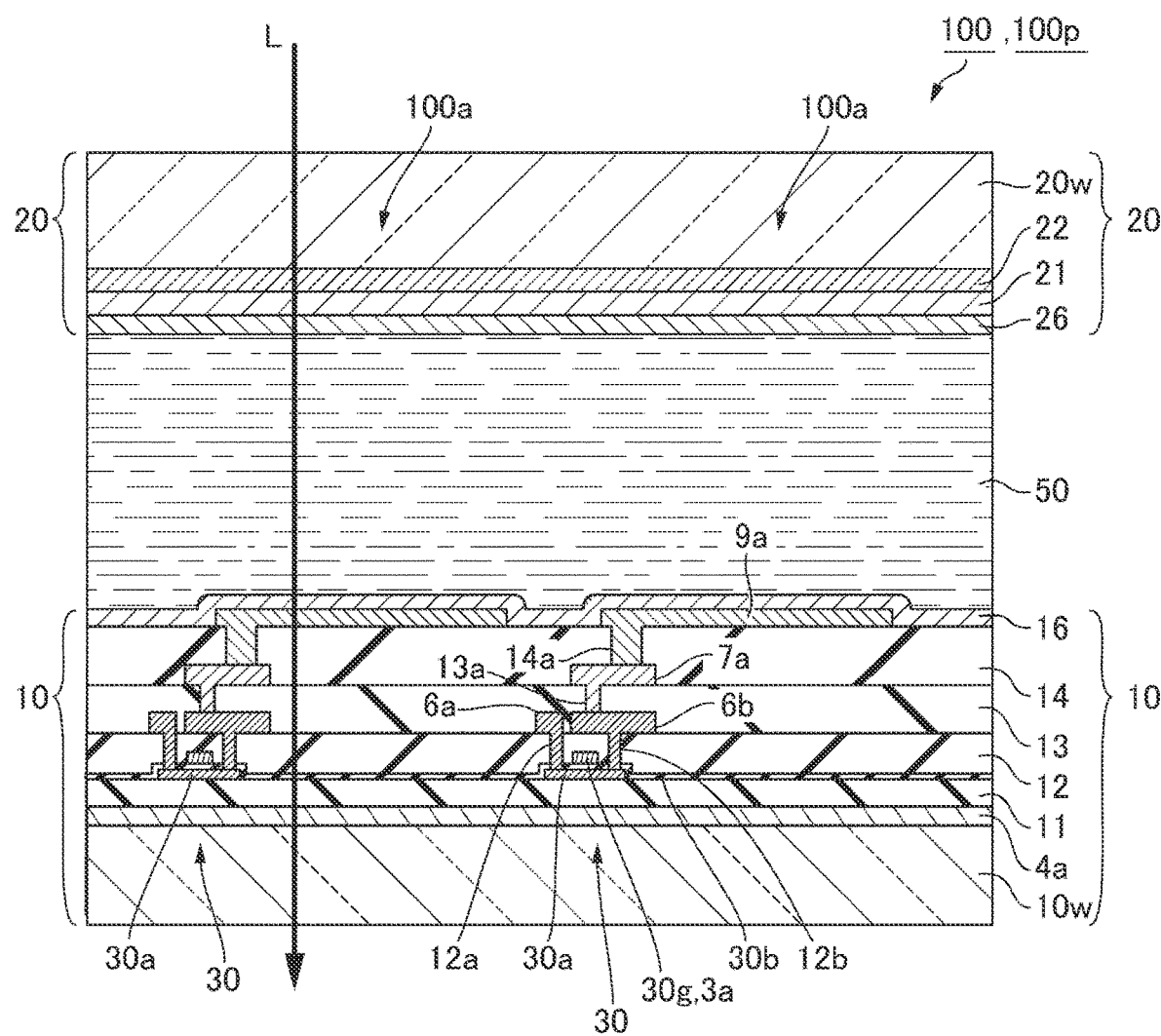
FIG. 4 is a sectional view schematically illustrating a configuration example of a pixel of the electrooptical device illustrated in FIG. 1.

FIG. 4 is a sectional view schematically illustrating a configuration example of the pixel 100a of the electrooptical device 100 illustrated in FIG. 1. As illustrated in FIG. 4, on the one surface 10s of the first substrate 10, a lower light shielding layer 4a made of a conductive film such as a conductive polysilicon film, a metal silicide film, a metal film, a metal compound film, or the like is formed. In the present embodiment, the light shielding layer 4a is made of a light shielding film such as tungsten silicide (WSi). A transparent insulation film 11 is formed on an upper side of the light shielding layer 4a, and the pixel transistor 30 including a semiconductor layer 30a is formed on a front surface side of the insulation film 11. In the present embodiment, the insulation film 11 is made of a silicon oxide film or the like.

The pixel transistor 30 includes the semiconductor layer 30a and the scanning line 3a (gate electrode 30g) intersecting with the semiconductor layer 30a, and a transparent gate insulation layer 30b is provided between the semiconductor layer 30a and the gate electrode 30g. The semiconductor layer 30a is configured with a polysilicon film (polycrystalline silicon film) or the like. In the present embodiment, the pixel transistor 30 has an LDD structure. The gate insulation layer 30b has a two-layer structure of a gate insulation layer made of a silicon oxide film obtained by thermally oxidizing the semiconductor layer 30a and a second gate insulation layer made of a silicon oxide film formed by a depressurization CVD method or the like. The light shielding layer 4a may be used as the scanning line 3a, and the gate electrode 30g may be electrically connected to the light shielding layer 4a (scanning line 3a) via a contact hole (not illustrated) penetrating the gate insulation layer 30b and the insulation film 11.

Transparent interlayer insulation films 12, 13, and 14 (a plurality of insulation layers) made of a silicon oxide film or the like are formed on an upper side of the gate electrode 30g in this order, and the storage capacitor 55 described with reference to FIG. 3 is configured with the interlayer insulation films 12, 13, and 14. In the present embodiment, the data line 6a and a drain electrode 6b are formed between the interlayer insulation film 12 and the interlayer insulation film 13, and a relay electrode 7a is formed between the interlayer insulation film 13 and the interlayer insulation film 14. The data line 6a is electrically connected to a source region of the semiconductor layer 30a via a contact hole 12a penetrating the interlayer insulation film 12 and the gate insulation layer 30b. The drain electrode 6b is electrically connected to a drain region of the semiconductor layer 30a via a contact hole 12b penetrating the interlayer insulation film 12 and the gate insulation layer 30b. The relay electrode 7a is electrically connected to the drain electrode 6b via a contact hole 13a penetrating the interlayer insulation film 13. The interlayer insulation film 14 includes a flat front surface, and the pixel electrode 9a is formed on the front surface of the interlayer insulation film 14 (a surface toward the electrooptical layer 50). The pixel electrode 9a is electrically connected to the relay electrode 7a via a contact hole 14a penetrating the interlayer insulation film 14. Therefore, the pixel electrode 9a is electrically connected to the drain region of the pixel transistor 30 via the relay electrode 7a and the drain electrode 6b.

Configuration of Temperature Sensor 8

Figure 5:
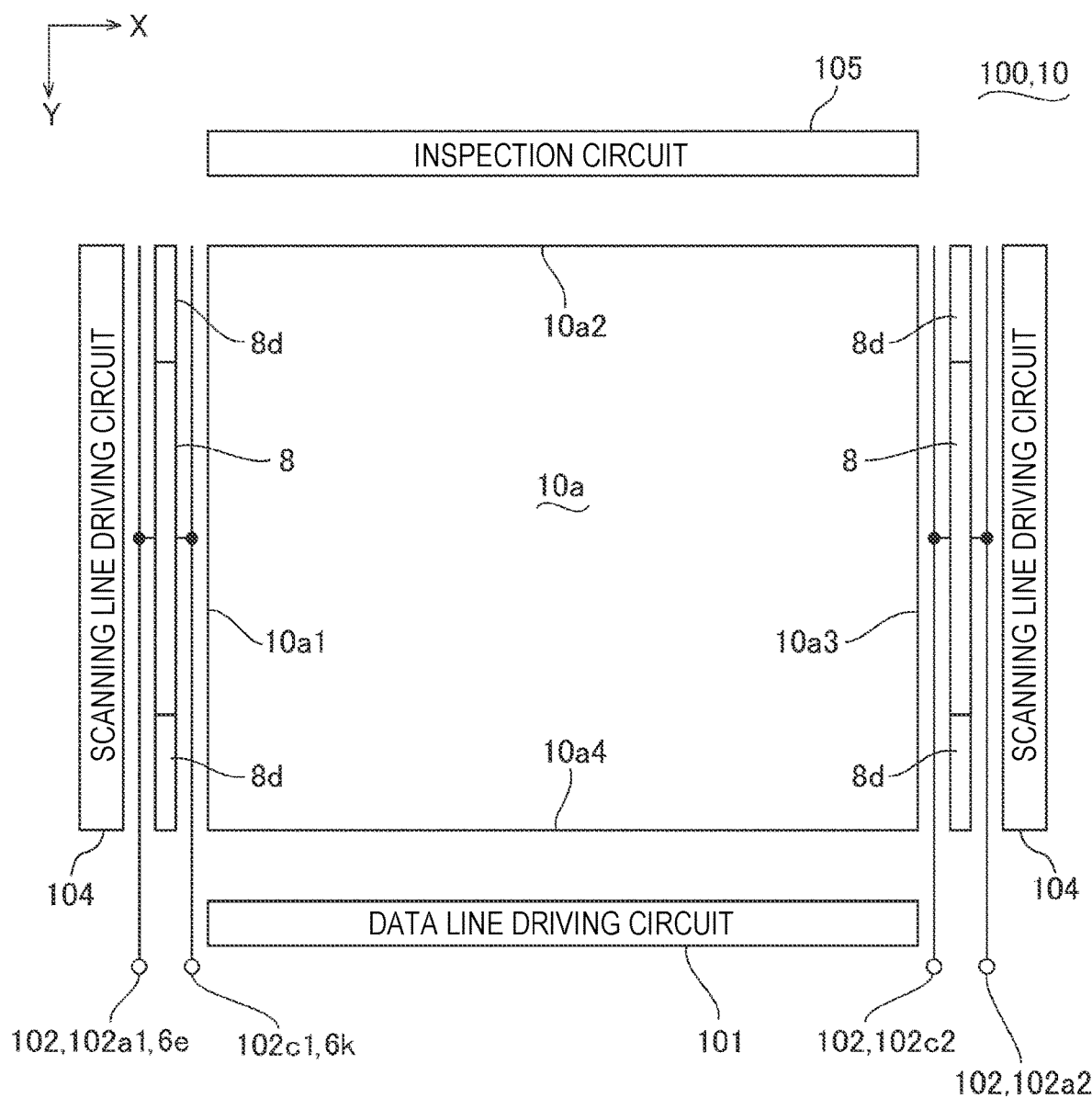
FIG. 5 is an explanatory diagram illustrating an electrical configuration for detecting a temperature of the electrooptical device illustrated in FIG. 1.
Figure 6:
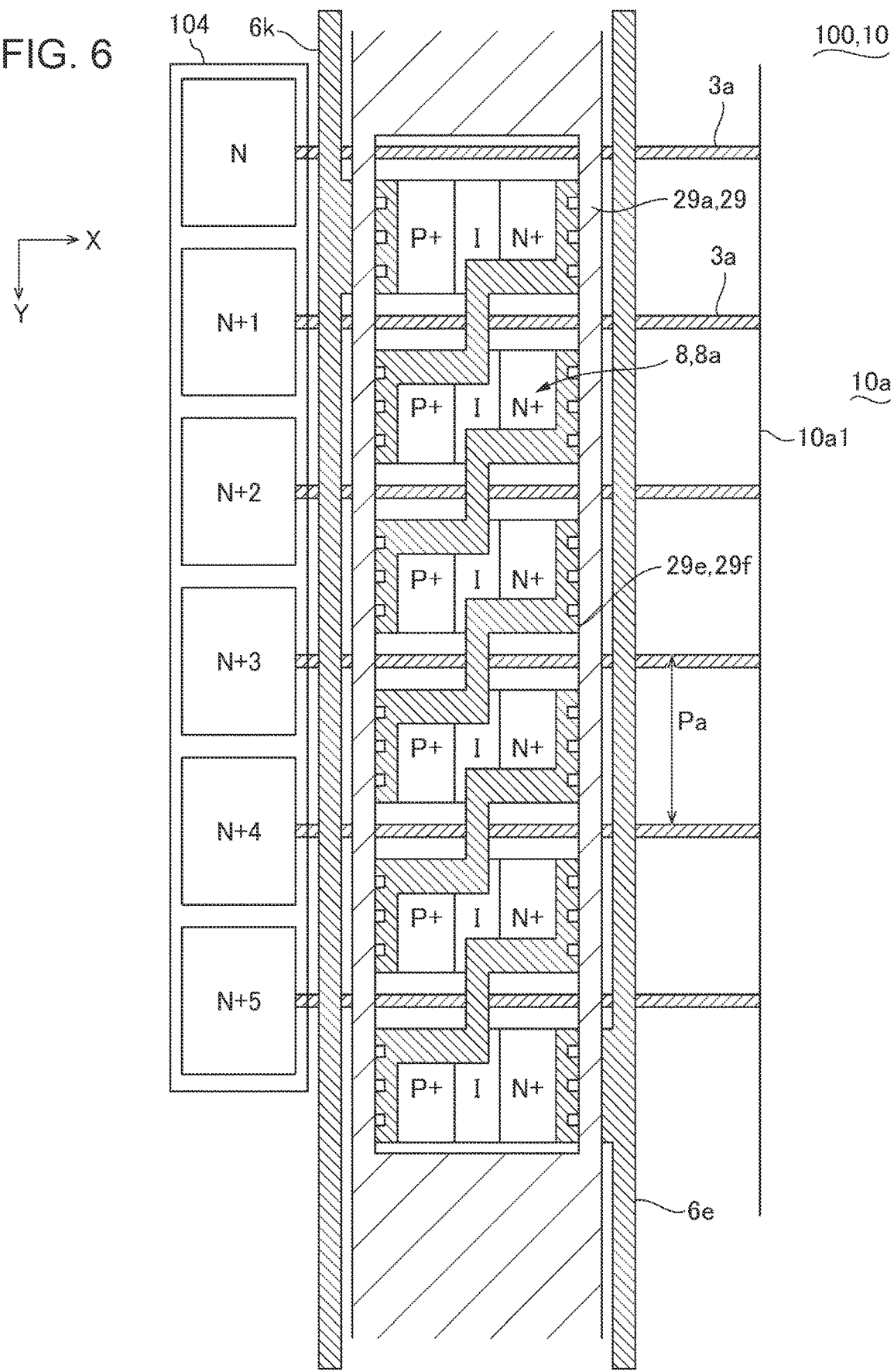
FIG. 6 is an explanatory diagram schematically illustrating a planar configuration between a scanning line driving circuit and a first side of a display region in the electrooptical device illustrated in FIG. 1.
Figure 7:
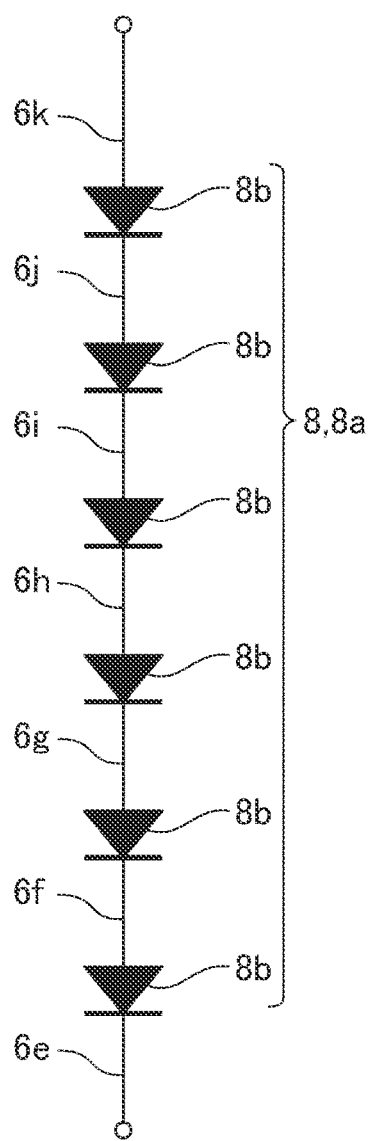
FIG. 7 is a circuit diagram of a semiconductor sensor illustrated in FIG. 6.
Figure 8:
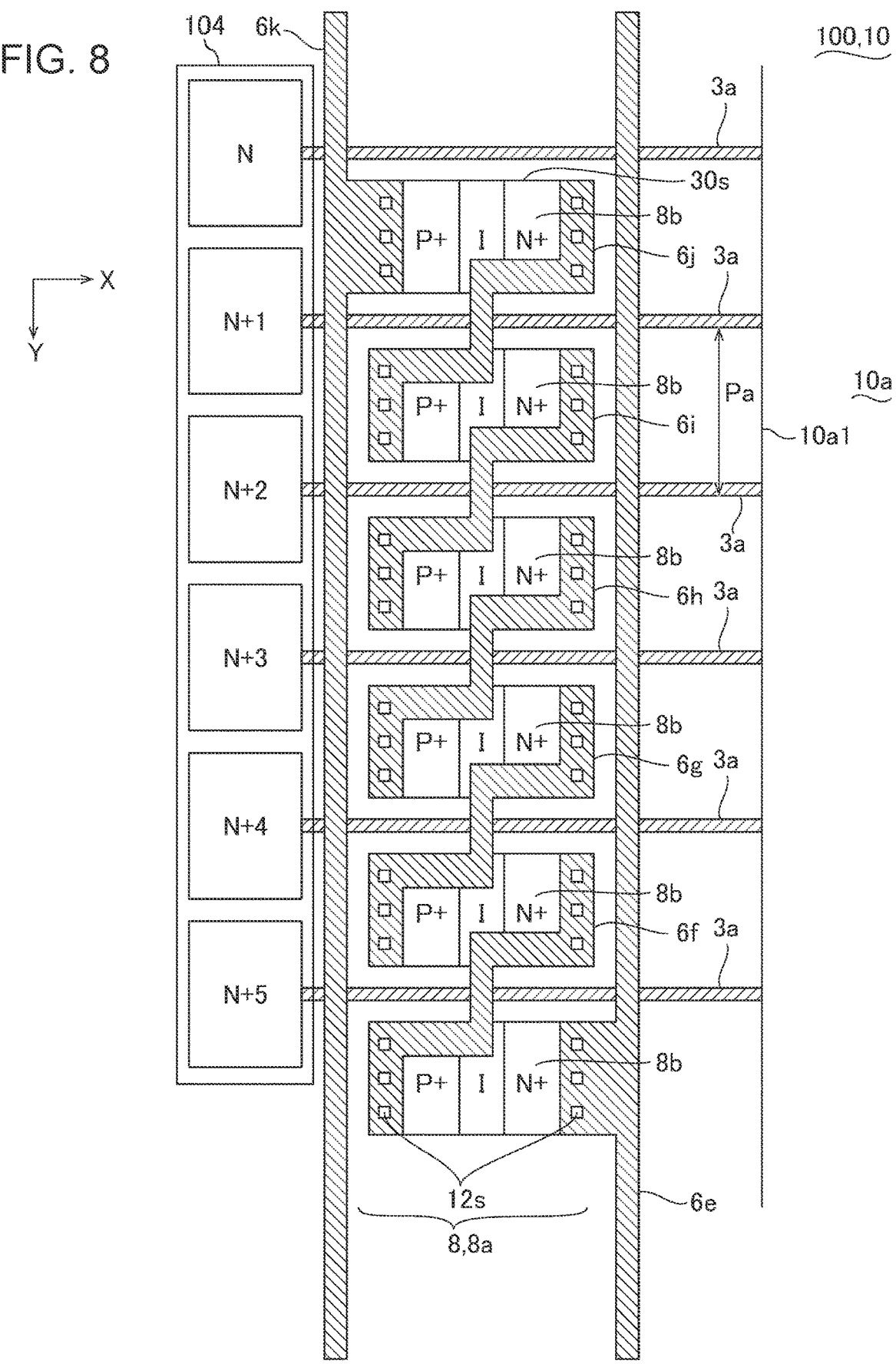
FIG. 8 is an explanatory diagram schematically illustrating a planar configuration of the semiconductor sensor illustrated in FIG. 6.
Figure 9:
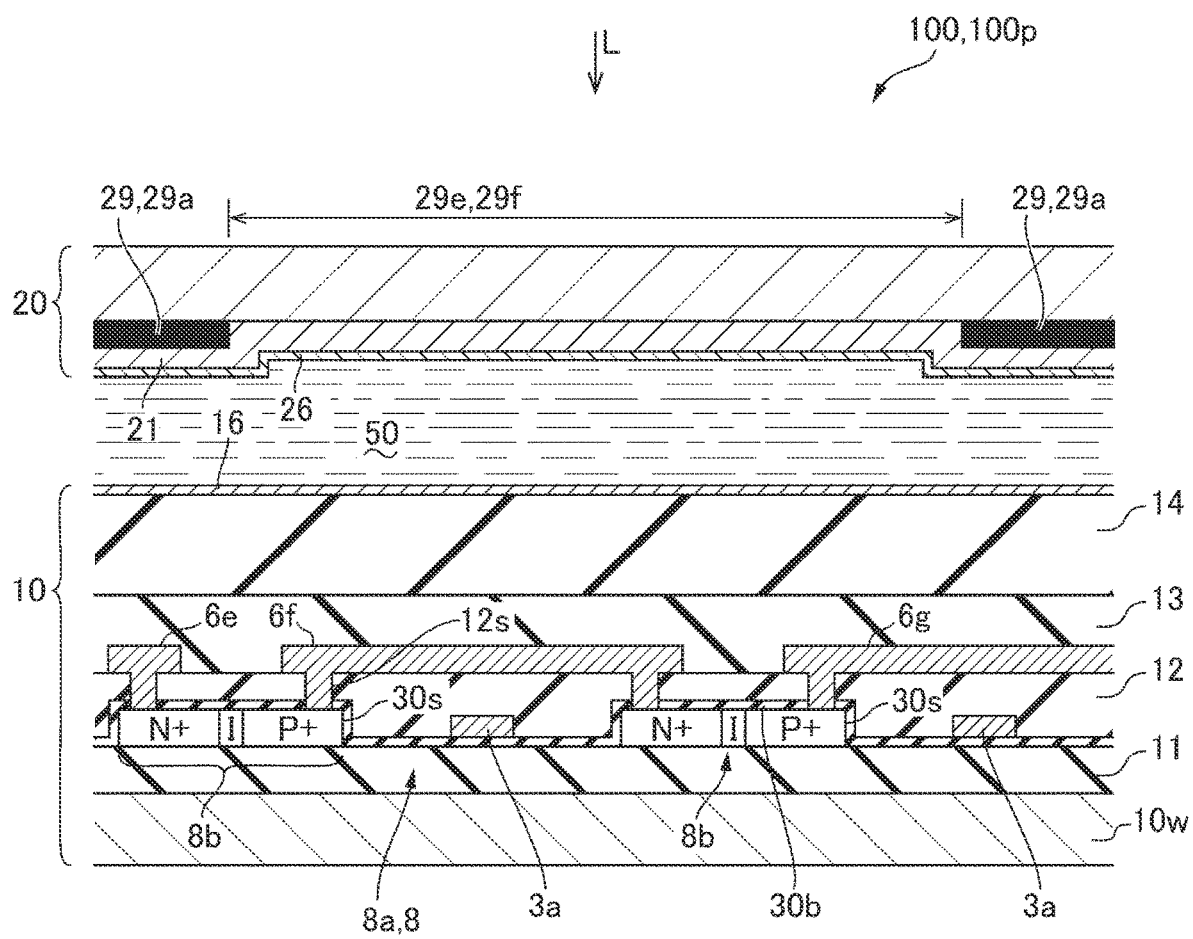
FIG. 9 is an explanatory view schematically illustrating a sectional configuration of the semiconductor sensor illustrated in FIG. 6.

FIG. 5 is an explanatory diagram illustrating an electrical configuration for detecting a temperature of the electrooptical device 100 illustrated in FIG. 1. FIG. 6 is an explanatory diagram schematically illustrating a planar configuration between the scanning line driving circuit 104 and the first side 10a1 of the display region 10a in the electrooptical device 100 illustrated in FIG. 1. FIG. 7 is a circuit diagram of a semiconductor sensor 8 illustrated in FIG. 6. FIG. 8 is an explanatory diagram schematically illustrating a planar configuration of the semiconductor sensor 8 illustrated in FIG. 6. FIG. 9 is an explanatory view schematically illustrating a sectional configuration of the semiconductor sensor 8 illustrated in FIG. 6.

As illustrated in FIG. 5, in the frame-shaped region 10b outside the display region 10a on the first substrate 10 of the electrooptical device 100, a semiconductor sensor 8 is formed between the scanning line driving circuit 104 and the first side 10a1 of the display region 10a so as to extend along the first side 10a1, and wiring extending from the semiconductor sensor 8 is connected to terminals 102a1 and 102c1 of the terminals 102. In the present embodiment, a semiconductor sensor 8 is also formed between the scanning line driving circuit 104 and the third side 10a3 of the display region 10a so as to extend along the third side 10a3, and wiring extending from the semiconductor sensor 8 is connected to terminals 102a2 and 102c2 of the terminals 102. A dummy pattern may be formed at a position adjacent to the semiconductor sensor 8 in the second direction Y.

In the present embodiment, as illustrated in FIG. 6, in the planar configuration near the first side 10a1, the semiconductor sensor 8 is formed at a position overlapping with the opening portion 29f (transparent portion 29e) of the parting light shielding layer 29a in a plan view. In the present embodiment, the semiconductor sensor 8 is a diode temperature sensor 8a including a sensor semiconductor layer 30s on the same layer as the semiconductor layer 30a of the pixel transistor 30 illustrated in FIG. 4. In FIG. 6, for convenience of the explanation, only a region near the opening portion 29f (transparent portion 29e) of the parting light shielding layer 29a is illustrated. Typically, the parting light shielding layer 29a extends in a direction toward the pixel electrode 9a to an end of the pixel electrode 9a on the outermost circumference of the display region 10a, and extends in a direction toward the scanning line driving circuit 104 (first circuit) to a region overlapping with the frame-shaped plate portion 110 covering the outer circumference region 10c of the liquid crystal panel 100p from the second substrate 20.

As illustrated in FIG. 7, the semiconductor sensor (diode temperature sensor 8a) includes a plurality of diode elements 8b (sensor elements) that are disposed along the first side 10a1 of the display region 10a and electrodes 6e to 6k that electrically connect the plurality of diode elements 8b. In the diode temperature sensor 8a, a number of diode elements 8b for obtaining a desired sensitivity are electrically connected to each other in series or in parallel. In the present embodiment, a case where the six diode elements 8b are electrically connected to each other in series is illustrated. In a case of a large-area semiconductor sensor, as will be described with reference to FIG. 15, a plurality of semiconductor sensors 8 (diode temperature sensors 8a) illustrated in FIG. 7 are disposed in parallel and are electrically connected to each other.

In the diode element 8b, a forward voltage when a constant current flows through the diode element 8b is also changed depending on a temperature. Therefore, by measuring the forward voltage when a constant current flows through the diode element 8b, the diode temperature sensor 8a can be used as the semiconductor sensor 8. In the present embodiment, a temperature of the electrooptical layer 50 is monitored by the semiconductor sensor 8, and thus a lifetime or the like of the electrooptical device 100 can be monitored by the semiconductor sensor 8. In addition, a driving condition of the electrooptical device 100 may be adjusted based on a monitoring result of the temperature of the electrooptical layer 50.

In the present embodiment, as illustrated in FIG. 8, the plurality of diode elements 8b are provided at an interval of n times (n is an integer of one or more) the wiring pitch Pa of the plurality of scanning lines 3a extending between the scanning line driving circuit 104 and the first side 10a1 of the display region 10a. In the present embodiment, the plurality of diode elements 8b are disposed between the plurality of scanning lines 3a extending between the scanning line driving circuit 104 and the first side 10a1 of the display region 10a, and are provided at an interval of one time the wiring pitch Pa of the plurality of scanning lines 3a extending between the scanning line driving circuit 104 and the first side 10a1 of the display region 10a.

More specifically, the scanning lines 3a linearly extend in the first direction X between the scanning line driving circuit 104 and the first side 10a1 of the display region 10a, and the sensor semiconductor layer 30s is formed between the scanning lines 3a. On the sensor semiconductor layer 30s, a high concentration P+ region, an intrinsic semiconductor layer (I layer), and a high concentration N+ region are formed in order along the first direction X. Thus, the plurality of scanning lines 3a do not overlap with the diode elements 8b in a plan view. Therefore, a wiring layer constituting the gate electrode 30g can be used for connecting the scanning line 3a from the scanning line driving circuit 104 to the display region 10a, and thus an efficient disposition can be realized.

Here, the pixel transistor 30 described with reference to FIG. 4 is an N-channel type thin film transistor, and the scanning line driving circuit 104 includes a CMOS circuit configured with an N-channel type thin film transistor and a P-channel type thin film transistor. Therefore, when the N-channel type thin film transistor and the P-channel type thin film transistor are formed, the diode element 8b can be formed at the same time.

In addition, as illustrated in FIGS. 8 and 9, a configuration on an upper side of the diode temperature sensor 8a (on the electrooptical layer 50 side) is substantially the same as the configuration described with reference to FIG. 4, and the plurality of interlayer insulation films 12, 13, and 14 are stacked between the diode temperature sensor 8a and the electrooptical layer 50. Therefore, the plurality of electrodes 6e to 6k connecting the diode elements 8b are formed by using a region between the interlayer insulation films 12 and 13. The electrodes 6e to 6k are formed on the same layer as the data line 6a and the drain electrode 6b that are illustrated in FIG. 4, and are formed on the region between the interlayer insulation films 12 and 13. Therefore, the electrodes 6e to 6k are connected to N+ layers and P+ layers of the diode elements 8b via a plurality of contact holes 12s formed on the interlayer insulation film 12. More specifically, the electrode 6e is connected to the N+ layer of the diode element 8b positioned at one end of the six diode elements 8b, as negative electrode wiring. The electrode 6e extends to the terminal 102 illustrated in FIG. 1. The electrode 6k is connected to the P+ layer of the diode element 8b positioned at the other end of the six diode elements 8b, as positive electrode wiring. The electrode 6k extends to the terminal 102 illustrated in FIG. 1. The electrodes 6f, 6g, 6h, 6i, and 6j are relay electrodes, and are connected between two adjacent diode elements 8b by being extended in the first direction X, then bent in the second direction Y, and further extended in the first direction X, the electrodes 6f, 6g, 6h, 6i, and 6j being connected to the N+ layer of one diode element 8b among the two adjacent diode elements 8b and the P+ layer of the other diode element 8b among the two adjacent diode elements 8b.

Although the semiconductor sensor 8 is also formed between the scanning line driving circuit 104 and the third side 10a3 of the display region 10a, the semiconductor sensor 8 also has the same configuration as the configuration described above with reference to FIGS. 6, 7, 8, and 9. Therefore, a description of the semiconductor sensor 8 which is formed between the scanning line driving circuit 104 and the third side 10a3 of the display region 10a is omitted.

Main Effect According to Present Embodiment

As described above, in the present embodiment, since the semiconductor sensor 8 is provided between the scanning line driving circuit 104 (first circuit) and the display region 10a, the semiconductor sensor 8 is close to the display region 10a. Therefore, a temperature or the like of the display region 10a can be properly monitored by the semiconductor sensor 8. In addition, since the plurality of scanning lines 3a (first signal lines) extend between the scanning line driving circuit 104 and the display region 10a, it is difficult to provide a large-sized semiconductor sensor 8. On the other hand, in the present embodiment, the semiconductor sensor 8 (diode temperature sensor 8a) is divided into the plurality of diode elements 8b (sensor elements), and the plurality of diode elements 8b are disposed along the first side 10a1 of the display region 10a so as to be electrically connected to each other by the electrodes 6e to 6k. Therefore, the semiconductor sensor 8 has high sensitivity equivalent to that of a large-sized semiconductor sensor.

In addition, the diode elements 8b (sensor elements) are provided at a pitch of n times (n is an integer of one or more) the wiring pitch of the plurality of scanning lines 3a (first signal lines) extending between the scanning line driving circuit 104 and the first side 10a1 of the display region 10a. Therefore, the diode elements 8b can be disposed so as to avoid positions overlapping with the plurality of scanning lines 3a in a plan view, the scanning lines 3a extending between the scanning line driving circuit 104 and the first side 10a1 of the display region 10a. Accordingly, electrical interference hardly occurs between the scanning line 3a and the diode element 8b. That is, when the scanning line 3a and the diode element 8b are overlapped with each other in a plan view, only the gate insulation layer 30b is interposed between the scanning line 3a and the diode element 8b, and as a result, electrical interference easily occurs between the scanning line 3a and the diode element 8b. Particularly, in a case where the scanning line 3a is formed of the gate electrode 30g, a transistor element is formed at a portion at which the diode element 8b (sensor element) is formed. On the other hand, according to the present embodiment, the above problem can be prevented.

In addition, although the parting light shielding layer 29a is provided, the semiconductor sensor 8 is provided at a position overlapping with the transparent portion 29e provided at a portion of the frame-shaped region 10b. Therefore, the light shielding layer 29 is unlikely to influence a monitoring result of the temperature of the electrooptical layer 50 by the semiconductor sensor 8. Specifically, since the transparent portion 29e is provided on an opposite side of the semiconductor sensor 8 (on the second substrate 20) with the electrooptical layer 50 interposed therebetween, the electrooptical layer 50 in a portion overlapping with the semiconductor sensor 8 in a plan view is also irradiated with the light-source light L, similar to the electrooptical layer 50 of the display region 10a. Thus, a temperature difference between the electrooptical layer 50 in the portion overlapping with the semiconductor sensor 8 in a plan view and the electrooptical layer 50 of the display region 10a is small. Therefore, in the monitoring result by the semiconductor sensor 8, a temperature deviation between the electrooptical layer 50 in the portion overlapping with the semiconductor sensor 8 in a plan view and the electrooptical layer 50 of the display region 10a is small.

Second Embodiment

Figure 10:
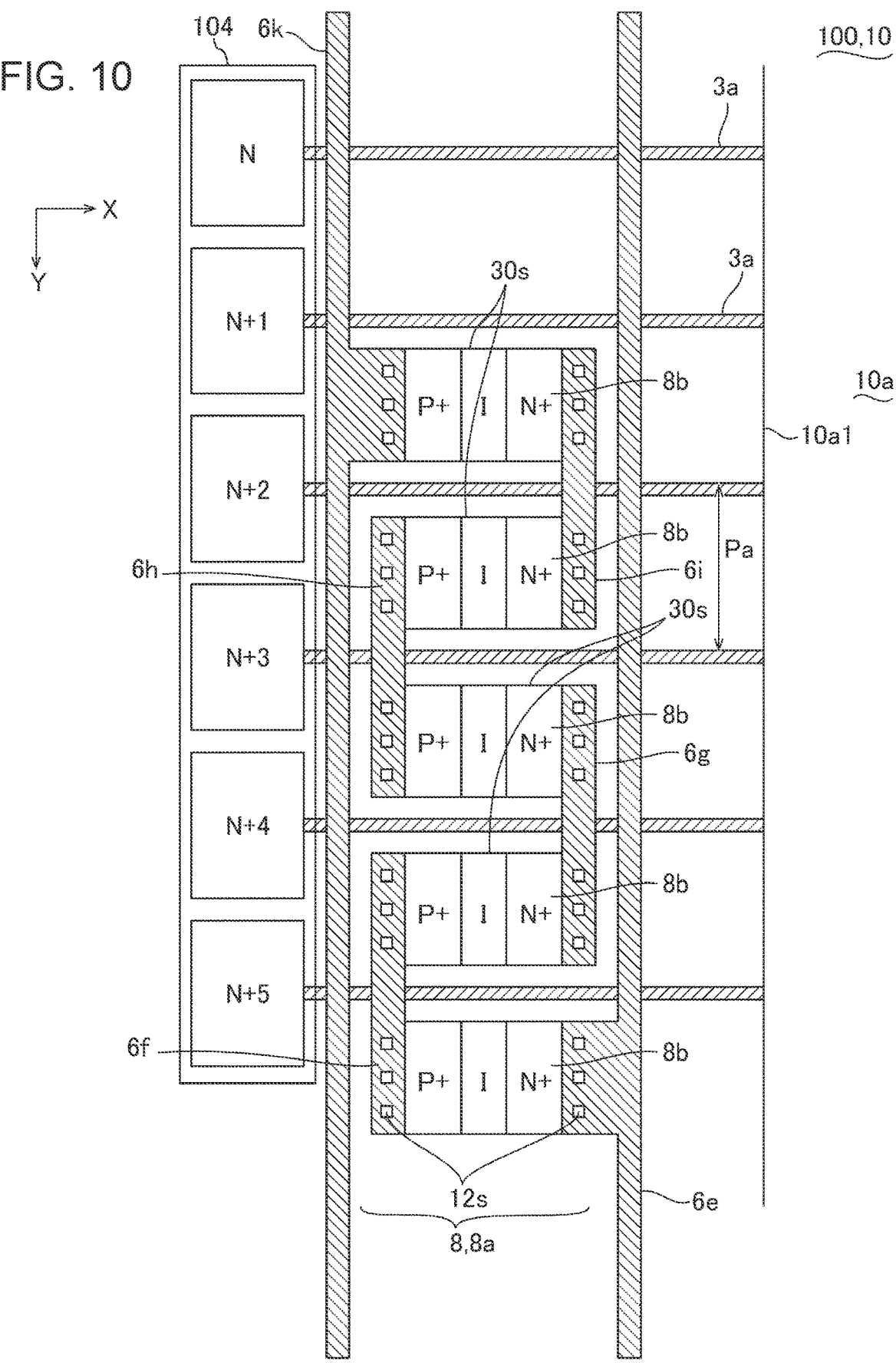
FIG. 10 is an explanatory diagram schematically illustrating a planar configuration of the semiconductor sensor formed in the electrooptical device according to a second embodiment of the invention.

FIG. 10 is an explanatory diagram schematically illustrating a planar configuration of the semiconductor sensor 8 formed in the electrooptical device 100 according to a second embodiment of the invention. The basic configuration of the present embodiment and embodiments to be described is the same as that of the first embodiment. Thus, common portions are denoted by the same reference numerals, and a detailed description thereof will be omitted.

In the first embodiment, although the six diode elements 8b are connected to each other in series, as illustrated in FIG. 10, in the semiconductor sensor 8 (diode temperature sensor 8a) according to the present embodiment, five diode elements 8b are connected to each other in series. In addition, the scanning lines 3a linearly extend in the first direction X between the scanning line driving circuit 104 and the first side 10a1 of the display region 10a, and the sensor semiconductor layer 30s is formed between the scanning lines 3a. Here, in the diode elements 8b adjacent to each other in the second direction Y, an order of the high concentration P+ region, the intrinsic semiconductor layer (I layer), and the high concentration N+ region in the first direction X is reversed. For this reason, similar to the first embodiment, the electrodes 6e and 6k extend in the second direction Y, and are opposed to each other with the diode elements 8b interposed therebetween. On the other hand, the relay electrodes (electrodes 6f, 6g, 6h, and 6i) extend in the second direction Y, and are connected to the P+ layers of two adjacent diode elements 8b and the N+ layers of two adjacent diode elements 8b.

Third Embodiment

Figure 11:
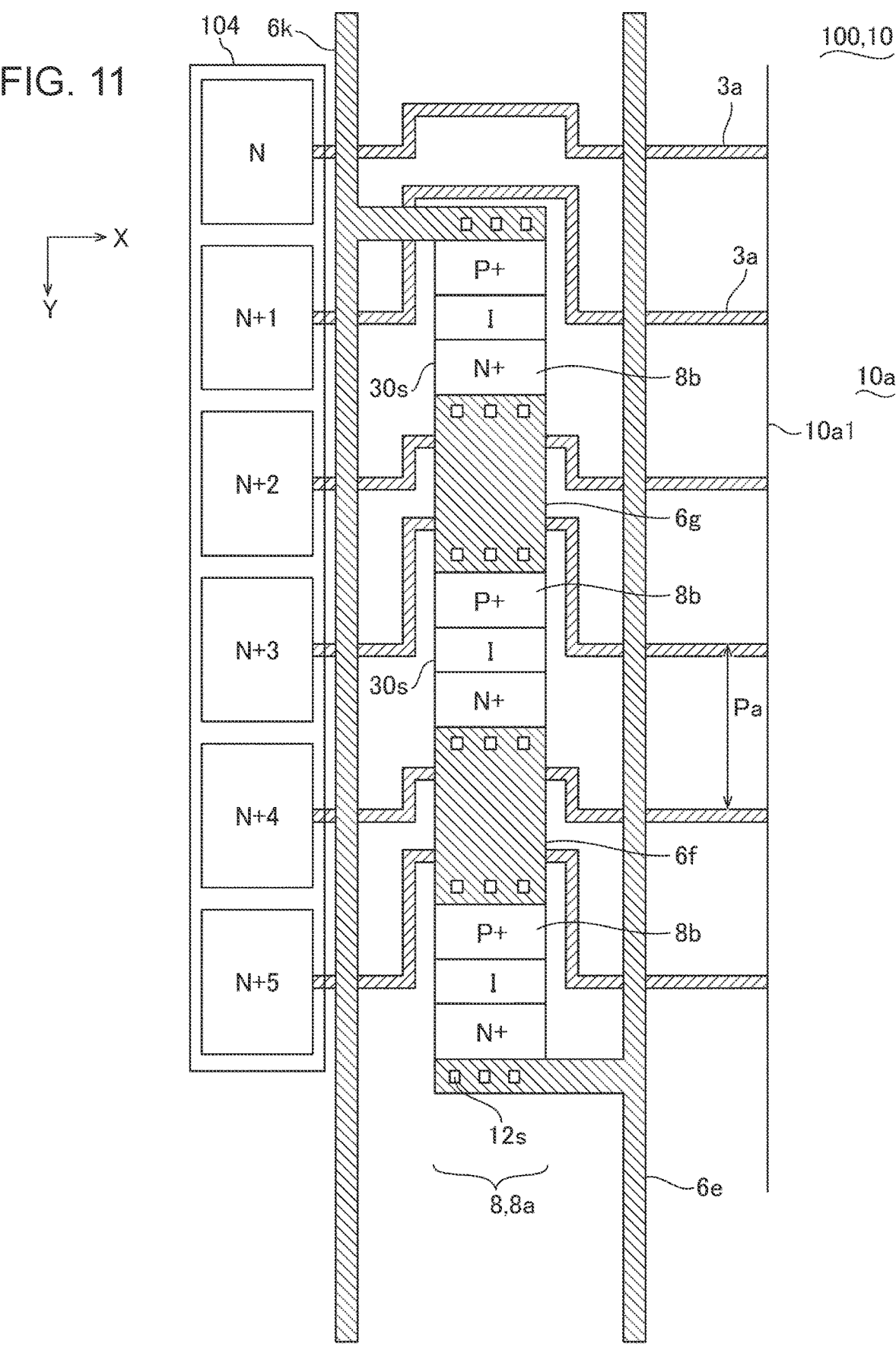
FIG. 11 is an explanatory diagram schematically illustrating a planar configuration of the semiconductor sensor formed in the electrooptical device according to a third embodiment of the invention.

FIG. 11 is an explanatory diagram schematically illustrating a planar configuration of the semiconductor sensor 8 formed in the electrooptical device 100 according to a third embodiment of the invention. As illustrated in FIG. 11, in the semiconductor sensor 8 (diode temperature sensor 8a) according to the present embodiment, three diode elements 8b are connected to each other in series. In addition, in a region between the scanning line driving circuit 104 and the first side 10a1 of the display region 10a, a part of the scanning line 3a is bent in the second direction Y, and then is linearly extended toward the display region 10a. In the present embodiment, the plurality of diode elements 8b are provided at a pitch of twice the wiring pitch Pa of the plurality of scanning lines 3a extending between the scanning line driving circuit 104 and the first side 10a1 of the display region 10a. Even in this case, a portion of the scanning line 3a is bent in the second direction Y, and thus the diode element 8b and the scanning line 3a do not overlap with each other in a plan view.

In the present embodiment, the sensor semiconductor layers 30s of the plurality of diode elements 8b are formed so as to extend in the second direction Y, and the high concentration P+ region, the intrinsic semiconductor layer (I layer), and the high concentration N+ region are formed in this order in the second direction Y. For this reason, similar to the first embodiment, the electrodes 6e and 6k extend in the second direction Y, and are opposed to each other with the diode elements 8b interposed therebetween. On the other hand, the relay electrodes (electrodes 6f and 6g) extend in the second direction Y, and are connected between two adjacent diode elements 8b, the electrodes 6f and 6g being connected to the N+ layer of one diode element 8b among the two adjacent diode elements 8b and the P+ layer of the other diode element 8b among the two adjacent diode elements 8b.

Fourth Embodiment

Figure 12:
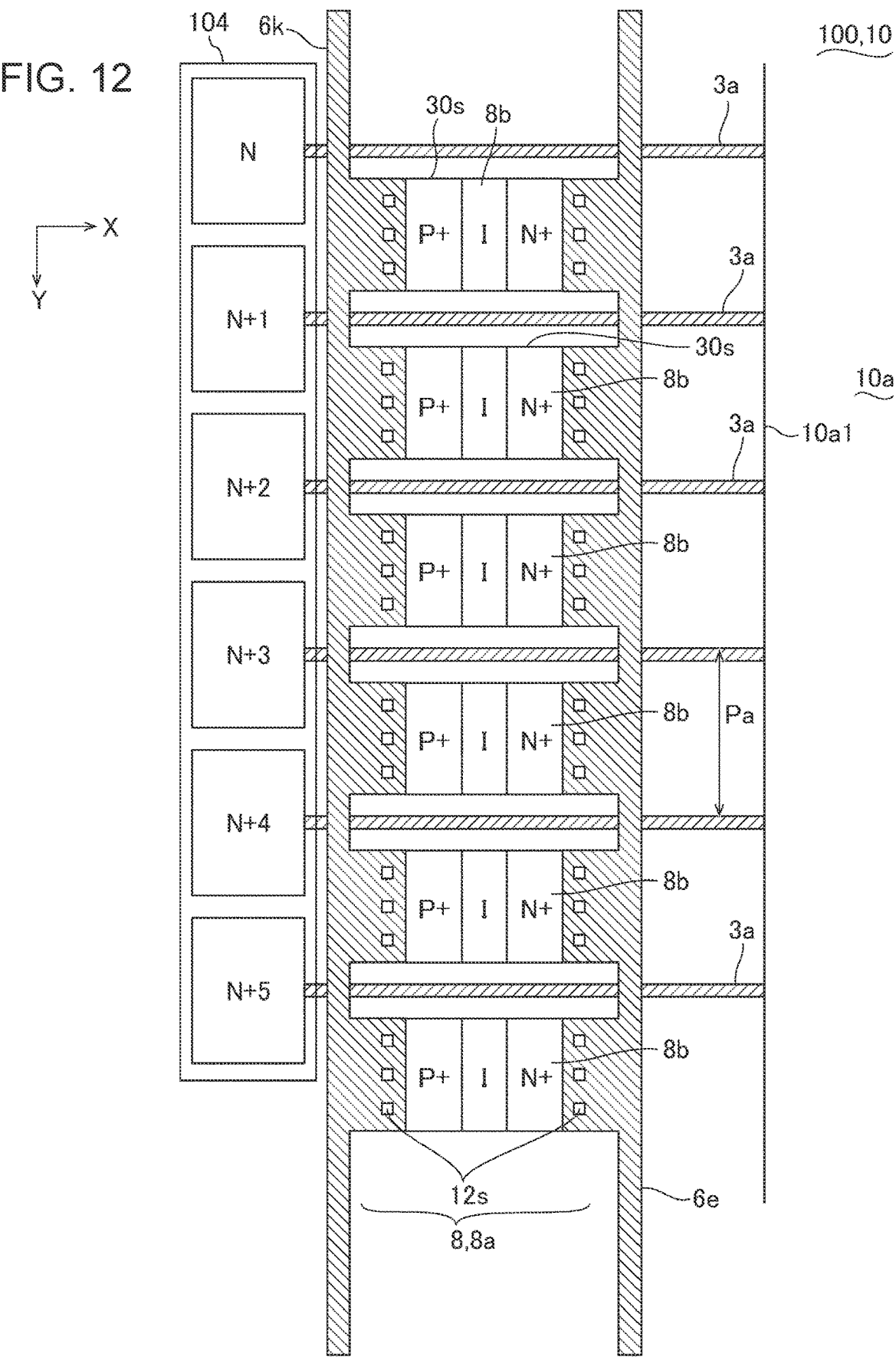
FIG. 12 is an explanatory diagram schematically illustrating a planar configuration of the semiconductor sensor formed in the electrooptical device according to a fourth embodiment of the invention.

FIG. 12 is an explanatory diagram schematically illustrating a planar configuration of the semiconductor sensor 8 formed in the electrooptical device 100 according to a fourth embodiment of the invention. As illustrated in FIG. 12, in the semiconductor sensor 8 (diode temperature sensor 8a) according to the present embodiment, six diode elements 8b are connected to each other in parallel. The scanning lines 3a linearly extend in the first direction X between the scanning line driving circuit 104 and the first side 10a1 of the display region 10a, and the sensor semiconductor layer 30s is formed between the scanning lines 3a. For this reason, the plurality of diode elements 8b are provided at a pitch of one time the wiring pitch Pa of the plurality of scanning lines 3a extending between the scanning line driving circuit 104 and the first side 10a1 of the display region 10a. Therefore, the scanning lines 3a do not overlap with the diode elements 8b in a plan view. Here, in the diode elements 8b adjacent to each other in the second direction Y, the high concentration P+ region, the intrinsic semiconductor layer (I layer), and the high concentration N+ region in the first direction X are disposed in the same order. For this reason, the electrodes 6e and 6k extend in the second direction Y, are opposed to each other with the diode elements 8b interposed therebetween, and are connected to the N+ layers and the P+ layers of the diode elements 8b.

Fifth Embodiment

Figure 13:
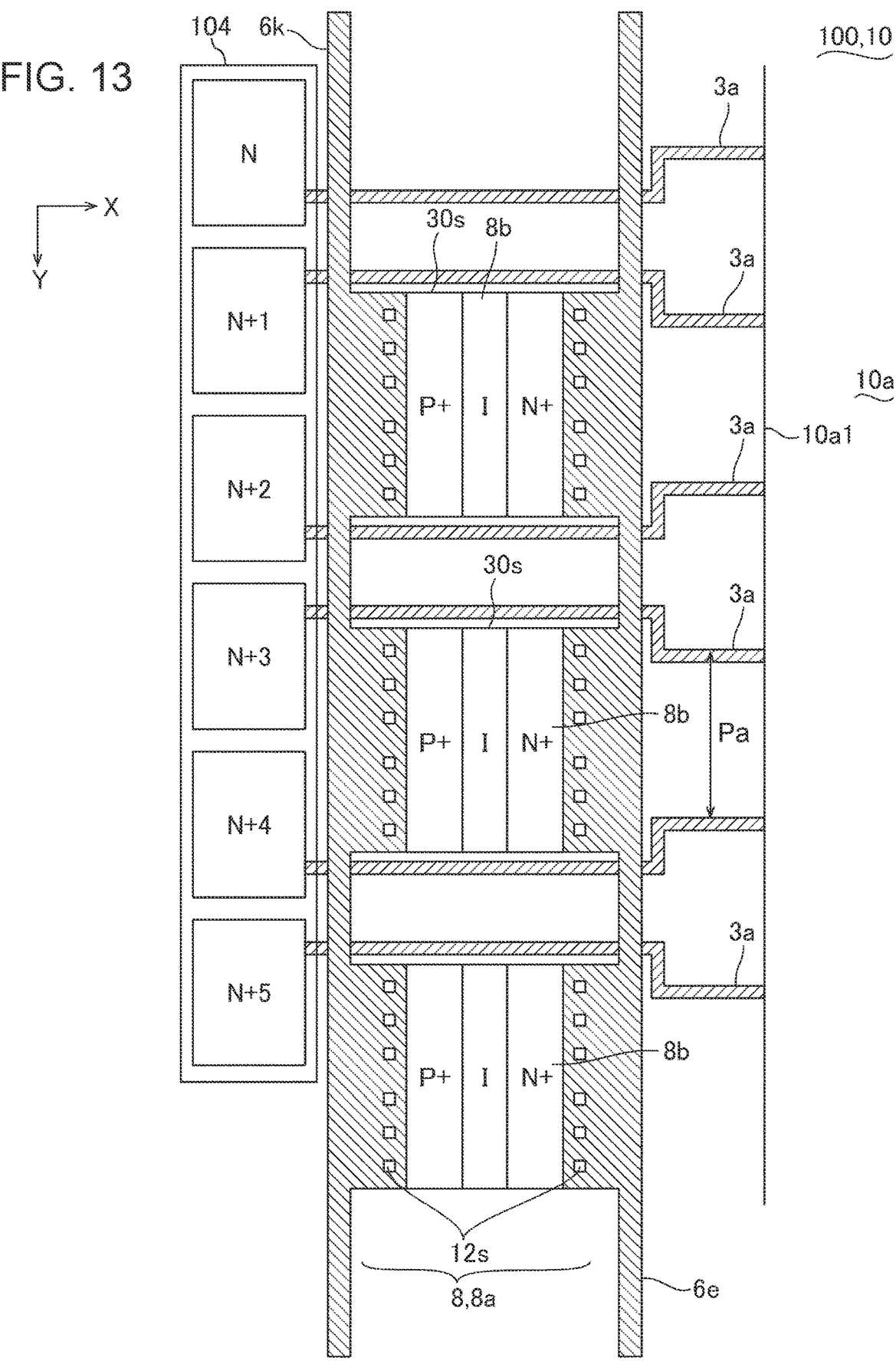
FIG. 13 is an explanatory diagram schematically illustrating a planar configuration of the semiconductor sensor formed in the electrooptical device according to a fifth embodiment of the invention.

FIG. 13 is an explanatory diagram schematically illustrating a planar configuration of the semiconductor sensor 8 formed in the electrooptical device 100 according to a fifth embodiment of the invention. As illustrated in FIG. 13, in the semiconductor sensor 8 (diode temperature sensor 8a) according to the present embodiment, three diode elements 8b are connected to each other in parallel. In the present embodiment, in a region at which the semiconductor sensor 8 is formed, one pair of scanning lines 3a that is configured with two scanning lines 3a is formed so as to have a narrow wiring pitch. Here, the scanning lines 3a are bent in a direction so as to be separated from each other between the semiconductor sensor 8 and the display region 10a, and thus the scanning lines 3a have a constant wiring pitch Pa.

In the present embodiment, the plurality of diode elements 8b are provided at an interval of twice the wiring pitch Pa of the plurality of scanning lines 3a extending between the scanning line driving circuit 104 and the first side 10a1 of the display region 10a. Even in this case, the sensor semiconductor layer 30s of the diode element 8b is provided in a region in which an interval between the scanning lines 3a is wide, and thus the sensor semiconductor layer 30s does not overlap with the scanning line 3a.

Sixth Embodiment

Figure 14:
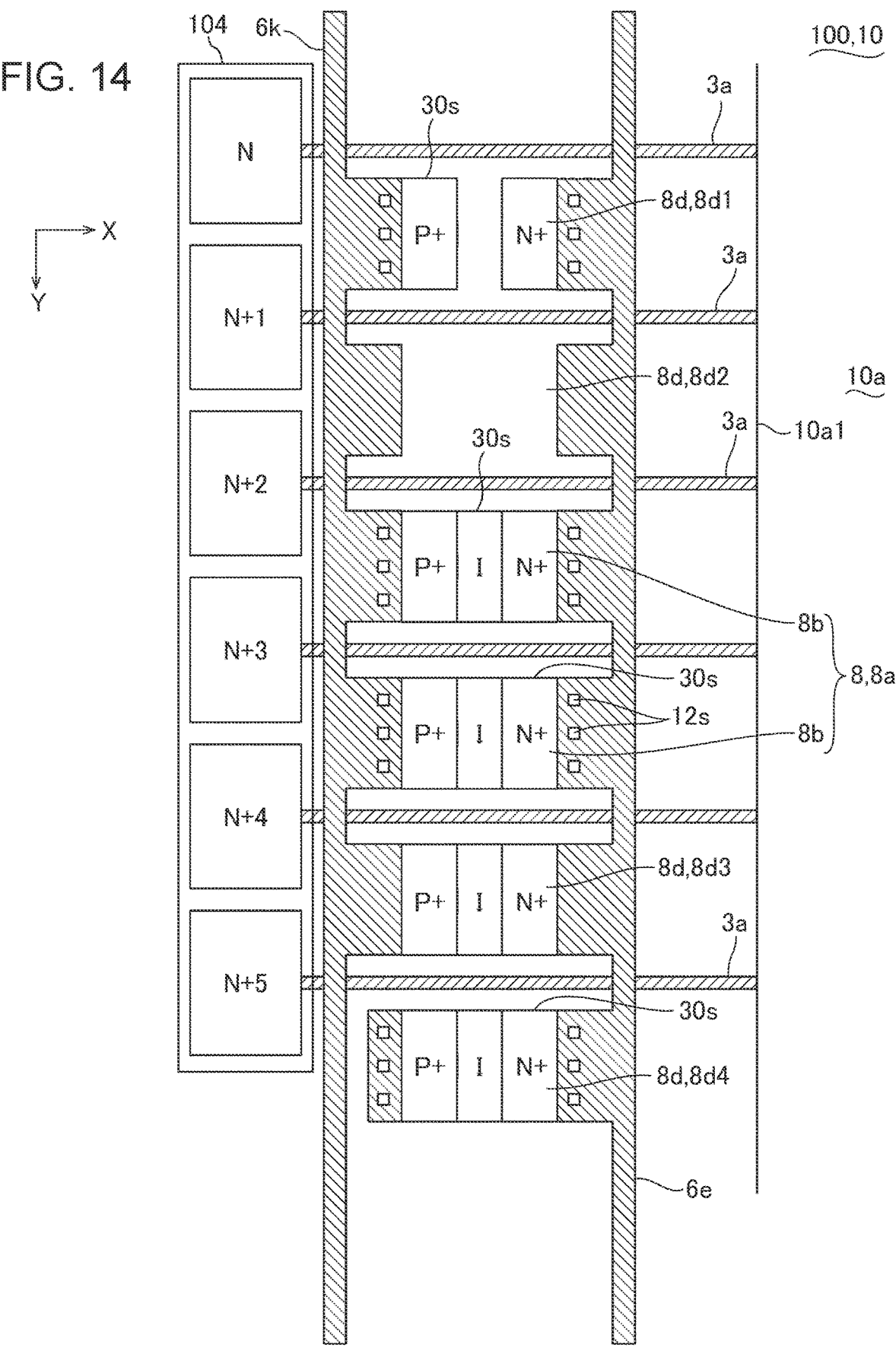
FIG. 14 is an explanatory diagram schematically illustrating a planar configuration of the semiconductor sensor formed in the electrooptical device according to a sixth embodiment of the invention.

FIG. 14 is an explanatory diagram schematically illustrating a planar configuration of the semiconductor sensor 8 formed in the electrooptical device 100 according to a sixth embodiment of the invention. As illustrated in FIG. 14, in the semiconductor sensor 8 (diode temperature sensor 8a) according to the present embodiment, two diode elements 8b are connected to each other in parallel. In the present embodiment, dummy elements 8d are provided in the second direction Y with respect to the diode elements 8b, the dummy element 8d being formed by excluding a part of components of the diode element 8b. Therefore, in flattening processing, a local stepped portion is unlikely to be formed between a region in which the diode element 8b is formed and a region in which the diode element 8b is not formed. In FIG. 14, examples of the dummy element 8d include a dummy element 8d1 in which a portion corresponding to the I region is excluded from the sensor semiconductor layer 30s, a dummy element 8d2 in which the sensor semiconductor layer 30s is excluded, a dummy element 8d3 in which the contact holes 12s are excluded, and a dummy element 8d4 in which a connection portion between the sensor semiconductor layer 30s and the electrode 6k is excluded. Although not illustrated in FIG. 14, the dummy element 8d may have a configuration in which a high-resistance resistor is formed without impurity implanting into at least one region of the P+ region and the N+ region (that is, a low-resistance region is excluded or a junction structure is excluded) and thus electrical conduction is not made in the sensor semiconductor layer 30s.

Seventh Embodiment

Figure 15:
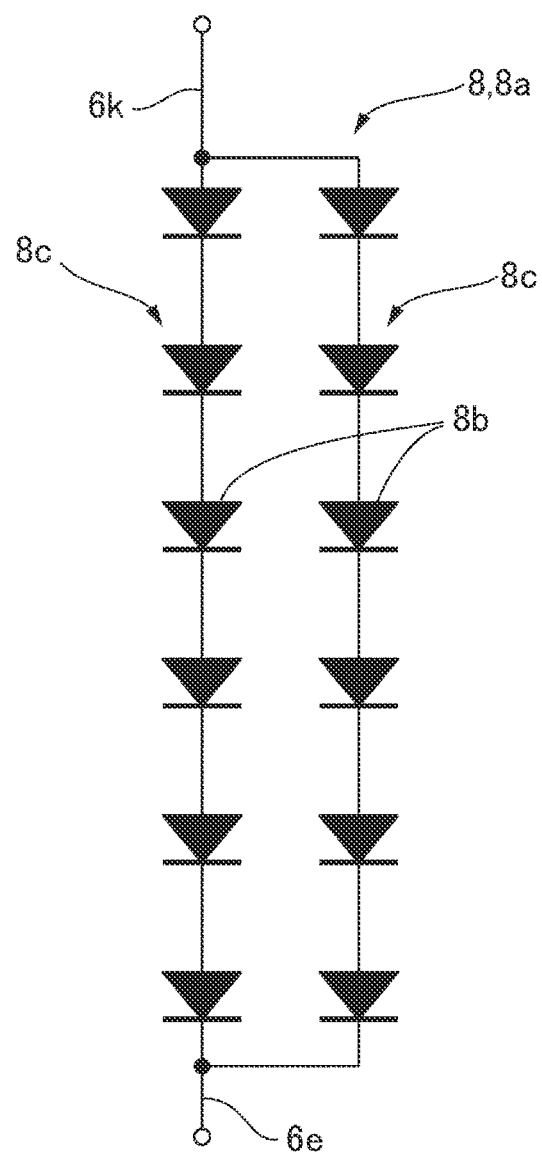
FIG. 15 is a circuit diagram of the semiconductor sensor formed in the electrooptical device according to a seventh embodiment of the invention.
Figure 16:
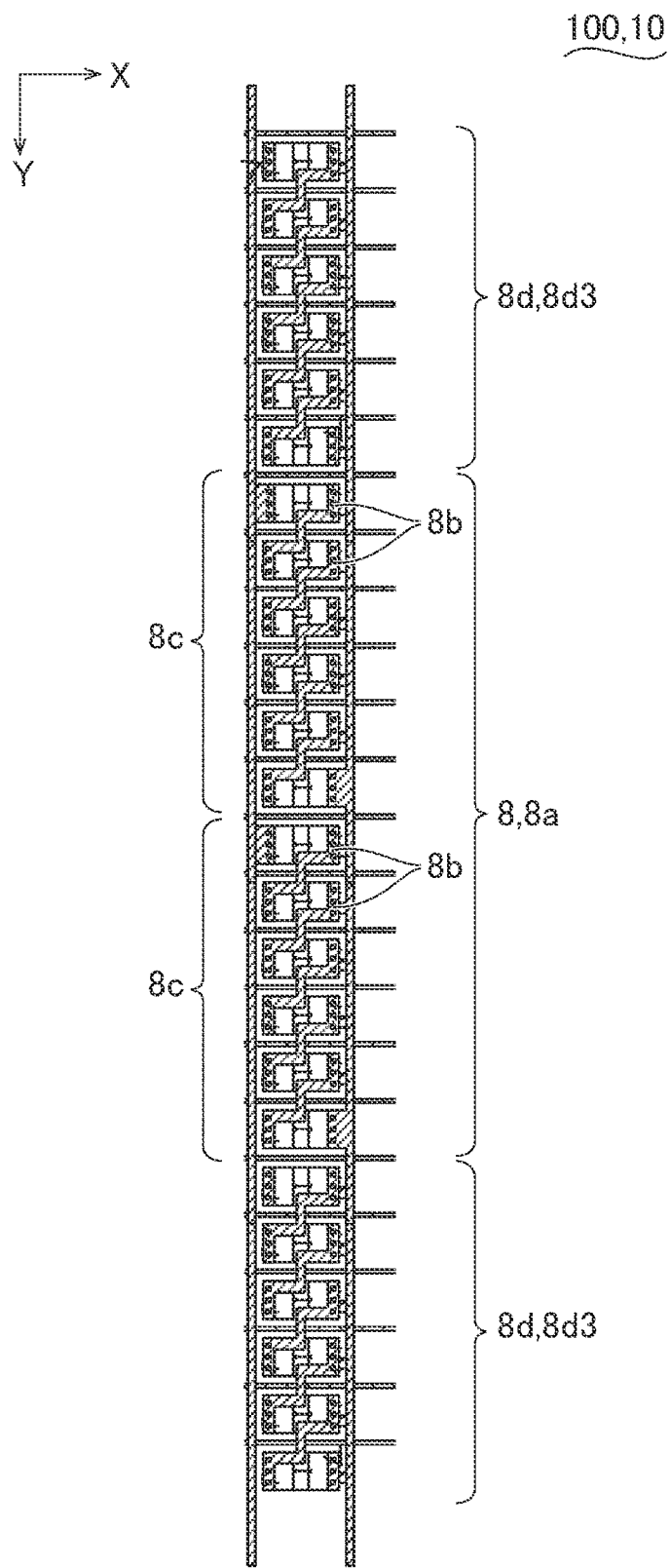
FIG. 16 is an explanatory diagram schematically illustrating a planar configuration of the semiconductor sensor illustrated in FIG. 15.

FIG. 15 is a circuit diagram of the semiconductor sensor 8 formed in the electrooptical device 100 according to a seventh embodiment of the invention. FIG. 16 is an explanatory diagram schematically illustrating a planar configuration of the semiconductor sensor 8 illustrated in FIG. 15. As illustrated in FIG. 15 and FIG. 16, in the semiconductor sensor 8 (diode temperature sensor 8a) according to the present embodiment, two sets 8c are connected to each other in parallel, the set 8c in which six diode elements 8b are connected to each other in series. In the semiconductor sensor 8 configured as described above, the sets 8c each in which the diode elements 8b are connected to each other in series are disposed in the second direction Y, and the dummy elements 8d are disposed on both sides of the sets 8c in the second direction Y. As the dummy element 8d, for example, as illustrated in FIG. 14, the dummy element 8d4 in which a connection portion between the sensor semiconductor layer 30s and the electrode 6k is excluded may be used. In this configuration, the number of the diode elements 8b and the number of the dummy elements 8d can be freely set according to a pattern when forming the electrodes 6e and 6k.

Eighth Embodiment

Figure 17:
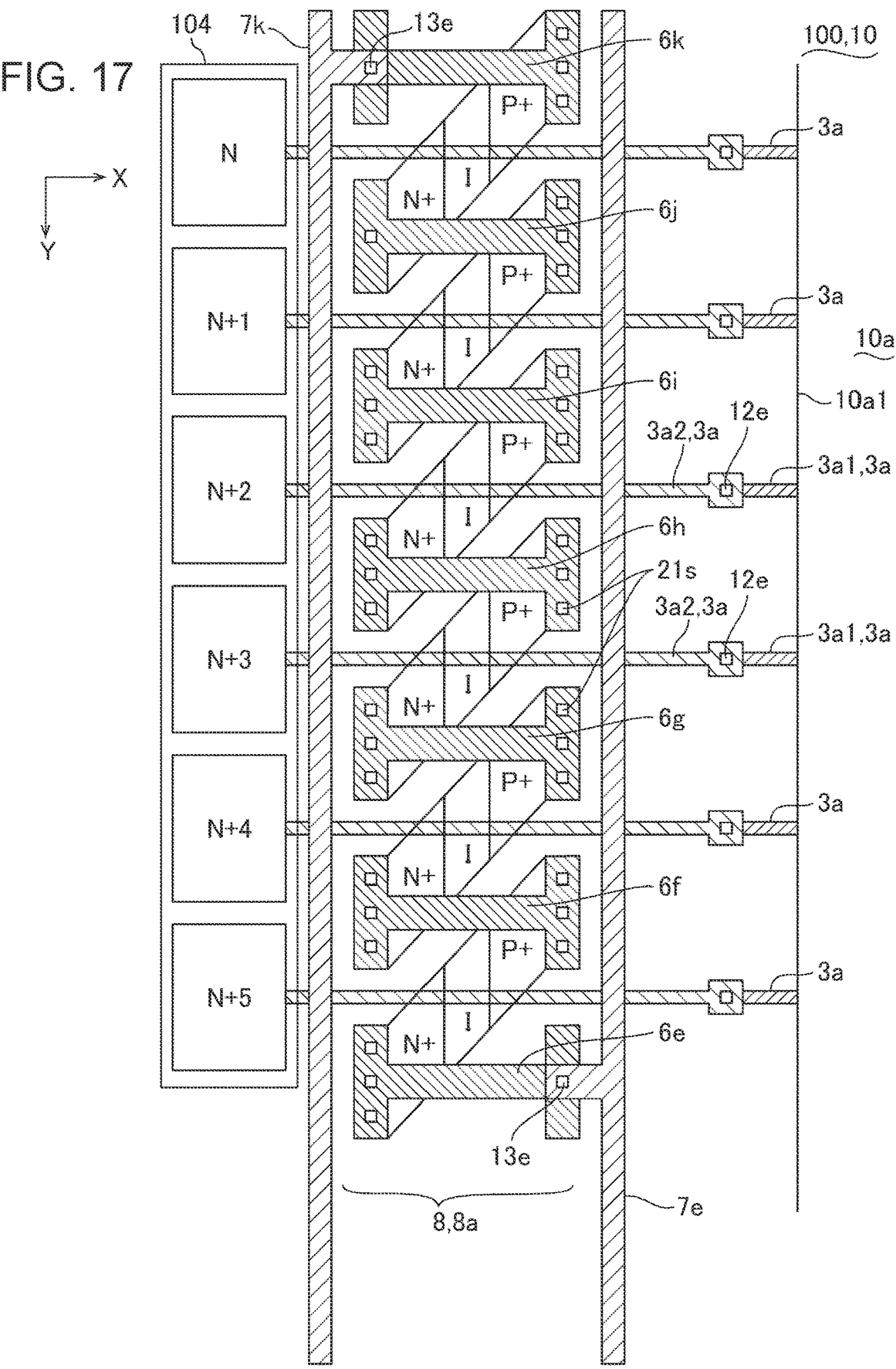
FIG. 17 is an explanatory diagram schematically illustrating a planar configuration of the semiconductor sensor formed in the electrooptical device according to an eighth embodiment of the invention.

FIG. 17 is an explanatory diagram schematically illustrating a planar configuration of the semiconductor sensor 8 formed in the electrooptical device 100 according to an eighth embodiment of the invention. As illustrated in FIG. 17, in the semiconductor sensor 8 (diode temperature sensor 8a) according to the present embodiment, six diode elements 8b are connected to each other in series. In addition, the scanning lines 3a linearly extend in the first direction X between the scanning line driving circuit 104 and the first side 10a1 of the display region 10a. Here, the sensor semiconductor layer 30s extends in a direction intersecting with the first direction X. Therefore, a part of the scanning line 3a overlaps with the diode element 8b in a plan view.

Even in this configuration, in the present embodiment, a wiring portion 3a2 of the scanning line 3a (a part of the scanning line 3a) that overlaps with the diode element 8b in a plan view is on the same layer as the data line 6a illustrated in FIG. 4, and is a conduction layer different from the gate electrode 30g. In addition, a wiring portion 3a1 extending from the wiring portion 3a2 toward the display region 10a is on the same layer as the gate electrode 30g, and the wiring portion 3a1 and the wiring portion 3a2 are electrically connected to each other via a contact hole 12e formed on the interlayer insulation film 12. Therefore, the interlayer insulation film 12 having a thick thickness is interposed between the wiring portion 3a1 and the diode element 8b, and thus electrical interference hardly occurs between the scanning line 3a and the diode element 8b. In the present embodiment, the electrodes 6e to 6k are on the same layer as the data line 6a. On the other hand, the electrodes 7e and 7k intersecting with the wiring portion 3a2 are on the same layer as the relay electrode 7a illustrated in FIG. 4, and are electrically connected to the electrodes 6e and 6k via contact holes 13e formed on the interlayer insulation film 13.

Ninth Embodiment

Figure 18:
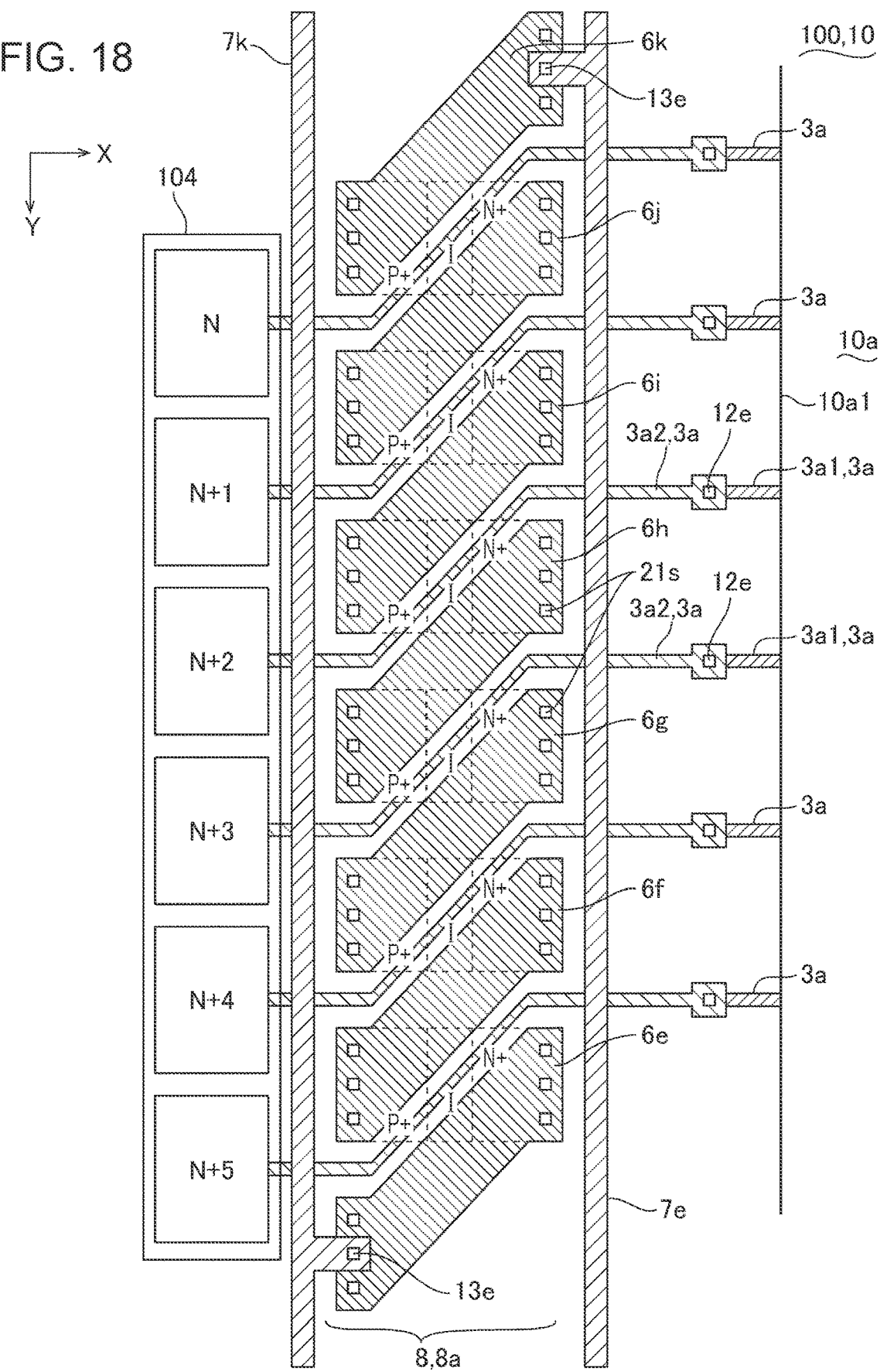
FIG. 18 is an explanatory diagram schematically illustrating a planar configuration of the semiconductor sensor formed in the electrooptical device according to a ninth embodiment of the invention.

FIG. 18 is an explanatory diagram schematically illustrating a planar configuration of the semiconductor sensor 8 formed in the electrooptical device 100 according to a ninth embodiment of the invention. As illustrated in FIG. 18, in the semiconductor sensor 8 (diode temperature sensor 8a) according to the present embodiment, six diode elements 8b are connected to each other in series. In addition, while the sensor semiconductor layer 30s extends in the first direction X, the scanning line 3a extends in a direction intersecting with the first direction X. Therefore, a part of the scanning line 3a overlaps with the diode element 8b in a plan view.

Even in this configuration, in the present embodiment, the wiring portion 3a2 of the scanning line 3a (a part of the scanning line 3a) that overlaps with the diode element 8b in a plan view is on the same layer as the data line 6a illustrated in FIG. 4, and is a conduction layer different from the gate electrode 30g. In addition, the wiring portion 3a1 extending from the wiring portion 3a2 toward the display region 10a is on the same layer as the gate electrode 30g, and the wiring portion 3a1 and the wiring portion 3a2 are electrically connected to each other via the contact hole 12e formed on the interlayer insulation film 12. Therefore, the interlayer insulation film 12 having a thick thickness is interposed between the wiring portion 3a1 and the diode element 8b, and thus electrical interference hardly occurs between the scanning line 3a and the diode element 8b. In the present embodiment, the electrodes 6e to 6k are on the same layer as the data line 6a. On the other hand, the electrodes 7e and 7k intersecting with the wiring portion 3a2 are on the same layer as the relay electrode 7a illustrated in FIG. 4, and are electrically connected to the electrodes 6k and 6e via contact holes 13e formed on the interlayer insulation film 13.

Tenth Embodiment

Figure 19:
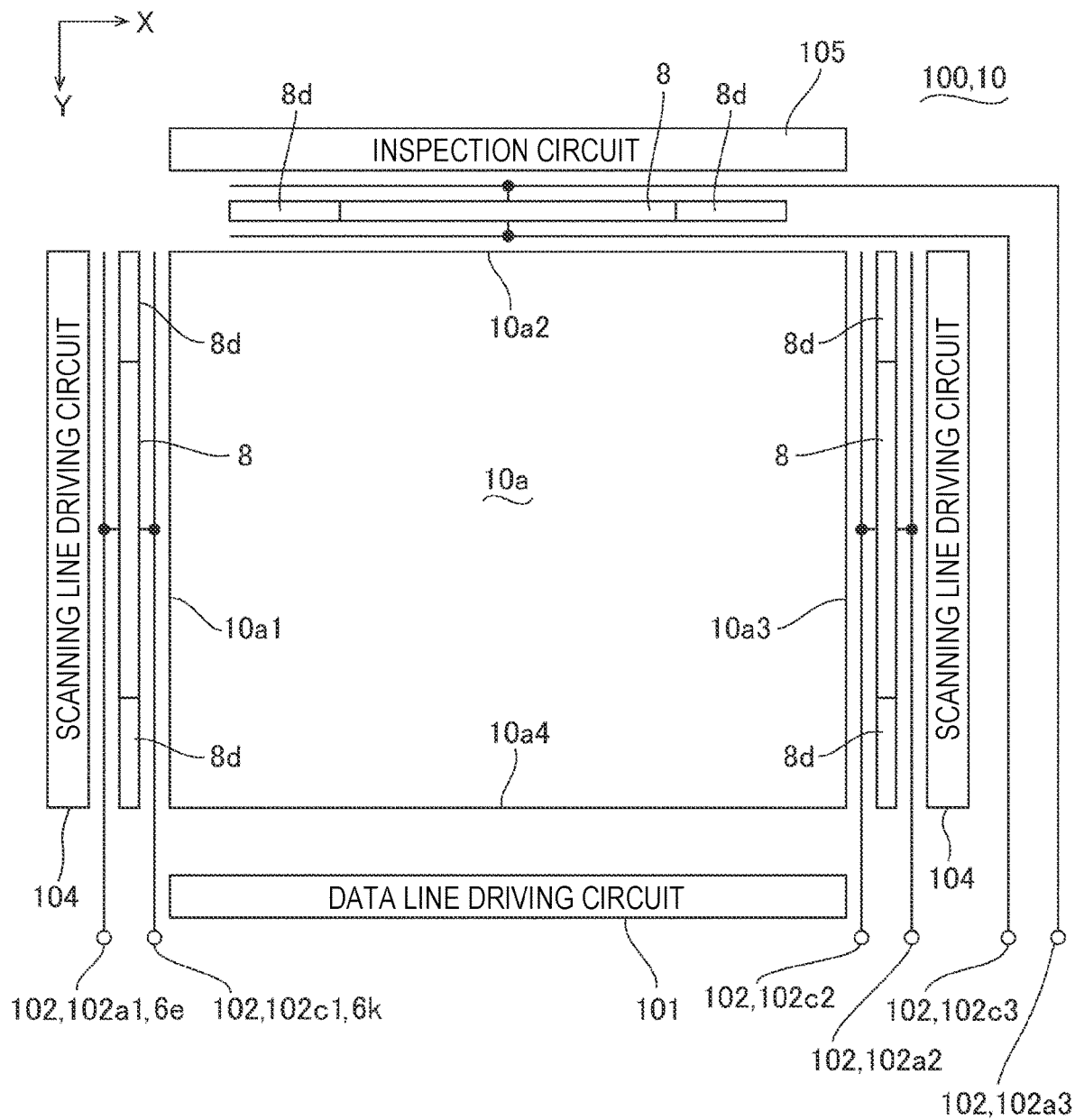
FIG. 19 is an explanatory diagram illustrating an electrical configuration for detecting a temperature of the electrooptical device according to a tenth embodiment of the invention.
Figure 20:
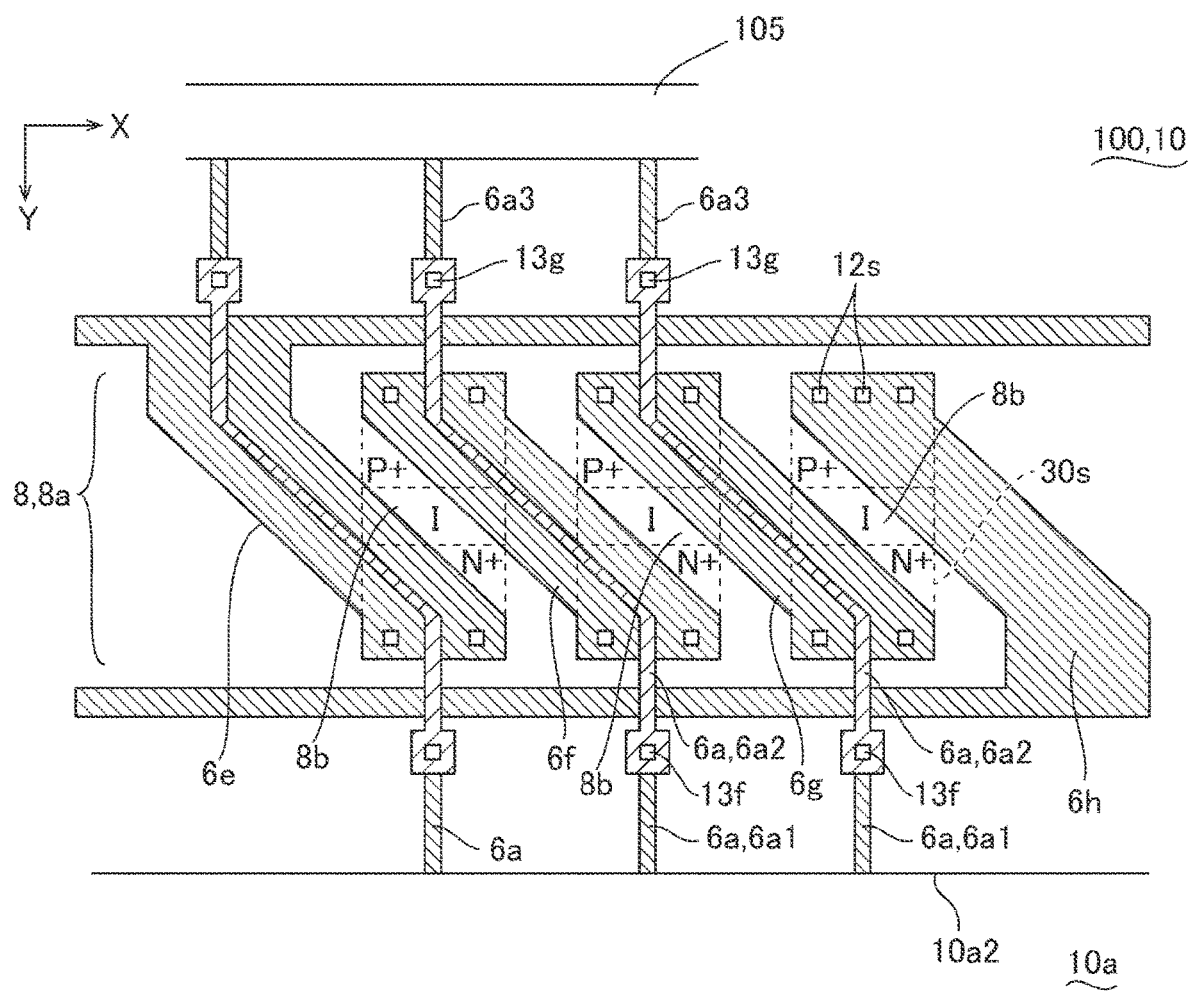
FIG. 20 is a circuit diagram of the semiconductor sensor illustrated in FIG. 19.

FIG. 19 is an explanatory diagram illustrating an electrical configuration for temperature detection of the electrooptical device 100 according to a tenth embodiment of the invention. FIG. 20 is a circuit diagram of the semiconductor sensor 8 illustrated in FIG. 19. As illustrated in FIG. 19, in the present embodiment, the semiconductor sensor 8 is formed between the second side 10a2 of the display region 10a and the inspection circuit 105 so as to extend along the second side 10a2, and wiring extending from the semiconductor sensor 8 is connected to terminals 102a3 and 102c3.

As illustrated in FIG. 20, in the semiconductor sensor 8 (diode temperature sensor 8a), three diode elements 8b are connected to each other in series. In addition, while the sensor semiconductor layer 30s extends in the second direction Y, the data line 6a extends in a direction intersecting with the second direction Y. Therefore, a part of the data line 6a overlaps with the diode element 8b in a plan view. Here, the electrodes 6e to 6h connected to the diode elements 8b are on the same layer as the drain electrode 6b.

Even in this configuration, in the present embodiment, a wiring portion 6a2 of the data line 6a (a part of the data line 6a) that overlaps with the diode element 8b in a plan view is on the same layer as the relay electrode 7a illustrated in FIG. 4, and is a conduction layer different from the gate electrode 30g. A wiring portion 6a1 extending from the wiring portion 6a2 toward the display region 10a is on the same layer as the drain electrode 6b, and the wiring portion 6a1 and the wiring portion 6a2 are electrically connected to each other via a contact hole 13f formed on the interlayer insulation film 13. A wiring portion 6a3 extending from the inspection circuit 105 to a region in which the diode element 8b is formed is also on the same layer as the drain electrode 6b, and the wiring portion 6a1 and the wiring portion 6a3 are electrically connected to each other via a contact hole 13g formed on the interlayer insulation film 13.

Eleventh Embodiment

Figure 21:
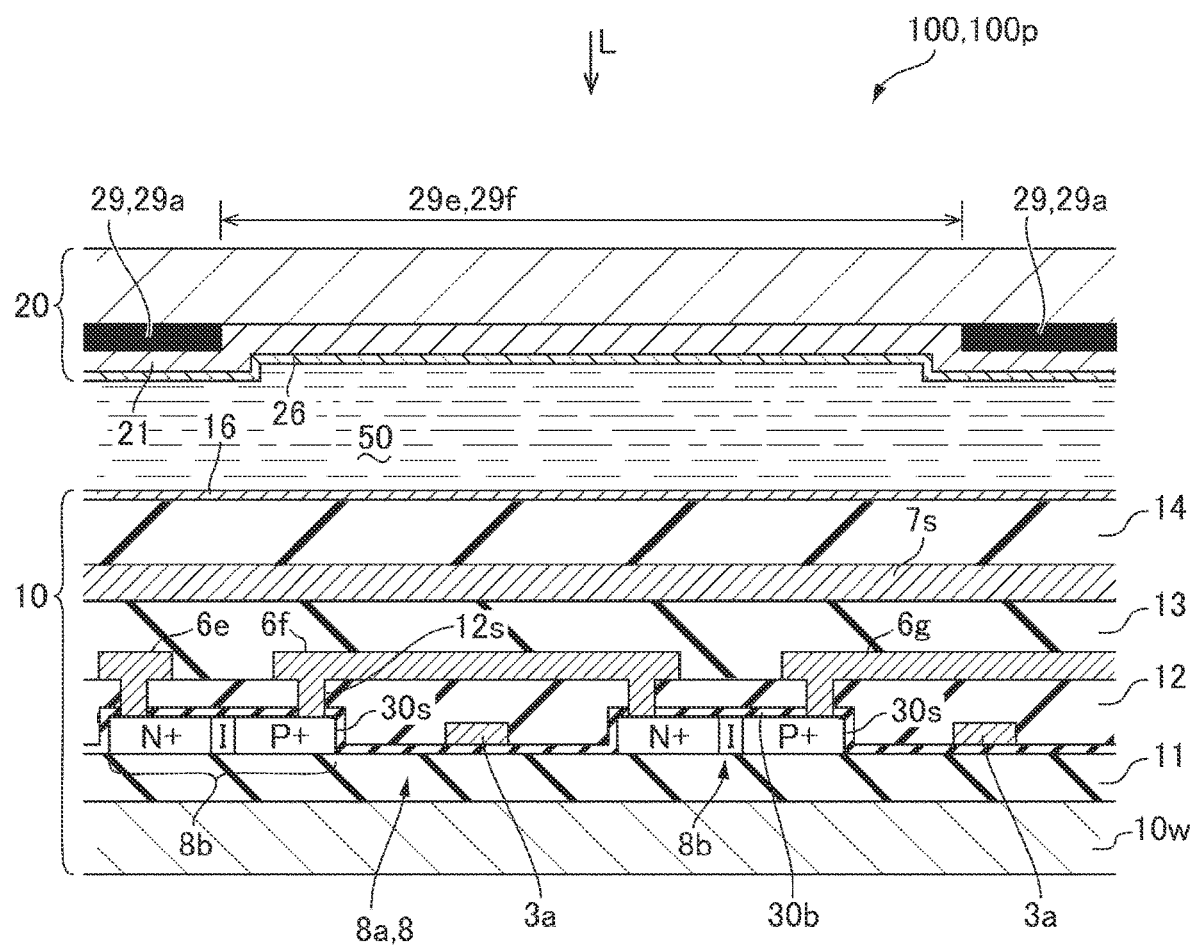
FIG. 21 is an explanatory view schematically illustrating a sectional configuration of the semiconductor sensor formed in the electrooptical device according to an eleventh embodiment of the invention.

FIG. 21 is an explanatory view schematically illustrating a sectional configuration of the semiconductor sensor 8 formed in the electrooptical device 100 according to an eleventh embodiment of the invention. As illustrated in FIG. 21, the plurality of interlayer insulation films 12, 13, and 14 are interposed between the electrooptical layer 50 and the semiconductor sensor 8 (diode temperature sensor 8a) on the first substrate 10. On the other hand, a heat transfer layer 7s is provided between the interlayer insulation films 13 and 14, the heat transfer layer 7s having a thermal conductivity higher than that of the interlayer insulation films 12, 13, and 14 made of silicon oxide films. The heat transfer layer 7s is a metal film which is on the same layer as the relay electrode 7a illustrated in FIG. 4 and has a light shielding property. Therefore, heat of the electrooptical layer 50 is easily transmitted to the semiconductor sensor 8. Accordingly, the temperature of the electrooptical layer 50 in the display region 10a can be properly monitored by the semiconductor sensor 8. In addition, since the heat transfer layer 7s has a light shielding property, light from the transparent portion 29e hardly leaks to the semiconductor sensor 8.

As illustrated in FIG. 6 of the first embodiment, FIG. 10 of the second embodiment, FIG. 11 of the third embodiment, FIG. 12 of the fourth embodiment, FIG. 13 of the fifth embodiment, FIG. 14 of the sixth embodiment, and FIG. 16 of the seventh embodiment, since the metal film, which is on the same layer as the relay electrode 7a and has a light shielding property, is not disposed in the semiconductor sensor 8 (diode temperature sensor 8a), it can be seen that the metal film is freely used as the heat transfer layer 7s. In addition, it can be easily seen that either or both of the electrode 6k and the electrode 7k illustrated in FIG. 17 of the eighth embodiment and FIG. 18 of the ninth embodiment are expanded and disposed so as to cover the sensor 8 (diode temperature sensor 8a). Further, as illustrated in FIG. 20 of the tenth embodiment, it can be easily seen that the metal film which is on the same layer as the relay electrode 7a and has a light shielding property is disposed in the semiconductor sensor 8 (diode temperature sensor 8a) so as to fill gaps between the data lines 6a.

Other Embodiments

In the embodiments described above, although the semiconductor sensor 8 is configured with the diode temperature sensor 8a, the invention may be applied to a case where the semiconductor sensor 8 detects another physical quantity such as illuminance. For example, in a case where the semiconductor sensor 8 having a large area is formed by applying the example illustrated in FIG. 12 of the fourth embodiment and the transparent portion 29e is provided, the semiconductor sensor 8 can be efficiently irradiated with ambient light. In a case of a direct-viewing type liquid crystal display apparatus with a normally black mode, a backlight has a relatively low brightness. Thus, by connecting the dummy pixel electrode 9b to a common potential, black display can be performed to such an extent that an uncomfortable feeling is not caused by the transparent portion 29e. In the embodiments described above, although the transparent portion 29e is configured with the opening portion of the light shielding layer 29 (parting light shielding layer 29a), since it is sufficient that the transparent portion 29e has transparency higher than that of the light shielding layer 29, the transparent portion 29e may be formed by a notch formed on the light shielding layer 29, a discontinued portion of the light shielding layer 29, or a partially-thinned portion of the light shielding layer 29. It goes without saying that the disposition positions of the semiconductor sensors and the disposition positions of the dummy elements on each side of the sides 10a1, 10a2, 10a3, and 10a4 can be freely combined to each other. For example, various modifications can be made such that the semiconductor sensors are disposed across the entire side 10a1 and the dummy elements are disposed across the entire side 10a3 facing the side 10a1.

The electrooptical device 100 to which the invention is applied is not limited to a liquid crystal device with a VA mode. For example, the invention may be applied to a case where the electrooptical device 100 is a liquid crystal device with a twisted nematic (TN) mode or an optically compensated bend (OCB) mode. In addition, although a transmission type liquid crystal device is illustrated in the embodiments described above, the invention may be applied to a reflection type liquid crystal device.

Example of Electrooptical Device Mounted on Electronic Apparatus

Figure 22:
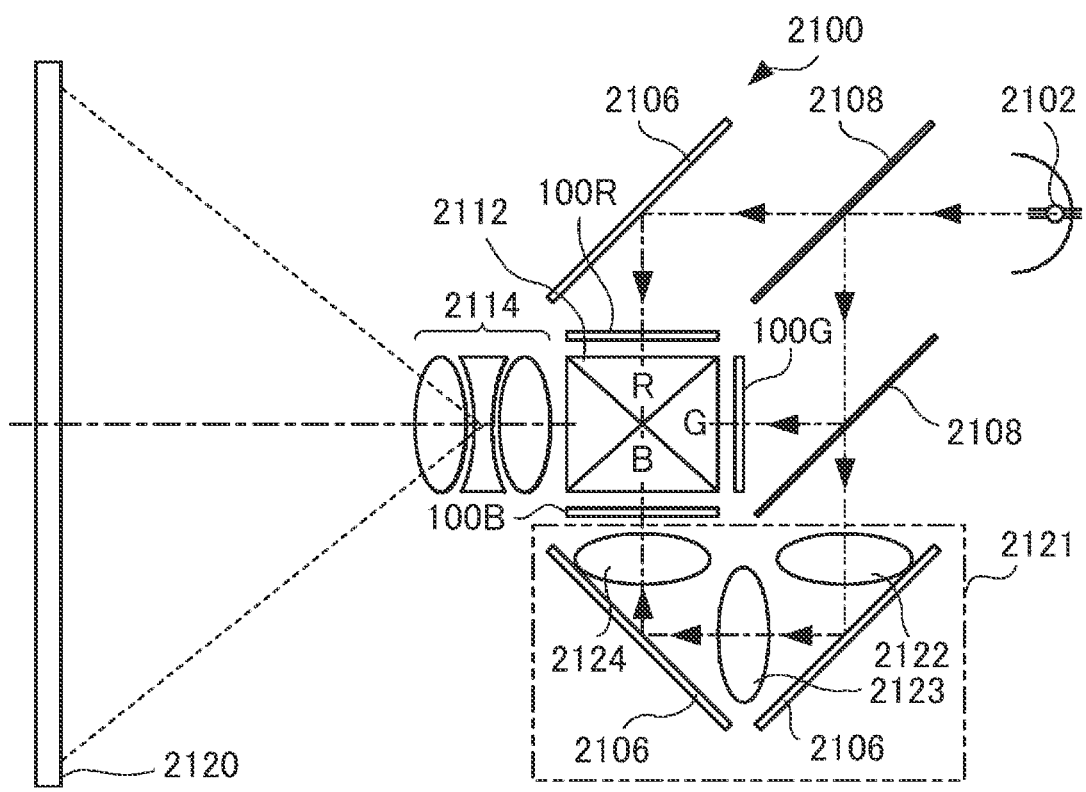
FIG. 22 is an explanatory diagram of a projection type display apparatus (electronic apparatus) using the electrooptical device to which the invention is applied.

An electronic apparatus using the electrooptical device 100 according to the above-described embodiment will be described. Here, as an example of the electronic apparatus according to the invention, a projection type display apparatus (liquid crystal projector) will be described as an example. FIG. 22 is an explanatory diagram of a projection type display apparatus (electronic apparatus) using the electrooptical device 100 to which the invention is applied. In the projection type display apparatus 2100 illustrated in FIG. 22, the transmission type electrooptical device 100 described above is used as a light bulb. The projection type display apparatus 2100 is provided with a lamp unit 2102 (light source unit) including a white light source such as a halogen lamp. A projection light beam emitted from the lamp unit 2102 is divided into light beams with three primary colors of red (R), green (G), and blue (B) by three mirrors 2106 and two dichroic mirrors 2108 disposed in the projection type display apparatus 2100. The divided projection light beams are guided to light bulbs 100R, 100G, and 100B corresponding to each color of the primary colors. The blue (B) color light beam has a long optical path as compared with the red (R) color light beam and the green (G) color light beam. Thus, in order to prevent a loss of the blue (B) color light beam, the blue (B) color light beam is guided via a relay lens system 2121 including a light-incident lens 2122, a relay lens 2123, and a light-emitting lens 2124.

In the projection type display apparatus 2100, three sets of liquid crystal apparatuses including the electrooptical device 100 are provided corresponding to each color of red (R), green (G), and blue (B) colors. A configuration of each of the light bulbs 100R, 100G, and 100B is the same as that of the above-described transmission type electrooptical device 100. The light beams modulated by the light bulbs 100R, 100G, and 100B are incident on a dichroic prism 2112 from three directions, respectively. On the dichroic prism 2112, the red (R) color light beam and the blue (B) color light beam are reflected at 90 degrees, and the green (G) color light beam is transmitted. Therefore, after images of the primary colors are synthesized, a color image is projected on a screen 2120 by a projection lens group 2114 (projection optical system).

Other Projection Type Display Apparatuses

The projection type display apparatus may employ a configuration in which an LED light source that emits color light beams is used as the light source unit and the color light beams emitted from the LED light source are supplied to other liquid crystal devices.

Other Electronic Apparatuses

The electronic apparatus including the electrooptical device 100 to which the invention is applied is not limited to the projection type display apparatus 2100 according to the embodiment. For example, the invention may be used for an electronic apparatus such as a projection type head up display (HUD), a direct-viewing type head mounted display (HMD), a personal computer, a digital still camera, or a liquid crystal television.

The entire disclosure of Japanese Patent Application No. 2017-097933, filed May 17, 2017 is expressly incorporated by reference herein.

What is claimed is:

1. An electrooptical device comprising:
   a plurality of first signal lines that extend in a first direction within a display region on one surface of a first substrate;
   a plurality of second signal lines that extend in a second direction intersecting with the first direction within the display region on the one surface of the first substrate;
   pixel electrodes that are provided corresponding to intersections between the first signal lines and the second signal lines on the one surface of the first substrate; and
   a first semiconductor sensor that is provided on the one surface of the first substrate, wherein:
   the first semiconductor sensor includes a first sensor element, a second sensor element and a first electrode;
   the first sensor element and the second sensor element are disposed along at least one side of the display region;
   the first electrode electrically connects the first sensor element and the second sensor element;
   the first sensor element and the second sensor element are each a diode element connected in series by the first electrode;
   an interval between the first sensor element and the second sensor element is n times a wiring pitch of the first signal lines, where n is an integer of one or more;
   the first sensor element and the second sensor element are disposed between the first signal lines; and
   the first signal lines do not overlap with the first sensor element and the second sensor element in a plan view.

2. The electrooptical device according to claim 1, wherein dummy elements are provided at least one side of the display region, the dummy elements being formed by excluding a part of components of the first semiconductor sensor.

3. The electrooptical device according to claim 1, wherein the first semiconductor sensor is a diode temperature sensor.

4. The electrooptical device according to claim 1, wherein the first semiconductor sensor is disposed along at least a side positioned on one side of the display region in the first direction.

5. The electrooptical device according to claim 1, further comprising:
   a second substrate facing the one surface of the first substrate; and
   an electrooptical layer provided between the first substrate and the second substrate,
   wherein a light shielding layer which is formed so as to surround the display region and a transparent portion which overlaps with the first semiconductor sensor in the plan view are provided on a side of the second substrate that is opposite to the first semiconductor sensor.

6. The electrooptical device according to claim 1, wherein:
   the first signal line is a scanning line; and
   the second signal line is a data line.

7. An electronic apparatus comprising:
   the electrooptical device according to claim 1.

8. An electronic apparatus comprising:
   the electrooptical device according to claim 2.

9. An electronic apparatus comprising:
   the electrooptical device according to claim 3.

10. An electronic apparatus comprising:
    the electrooptical device according to claim 4.

11. An electronic apparatus comprising:
    the electrooptical device according to claim 5.

12. An electronic apparatus comprising:
    the electrooptical device according to claim 6.

13. The electrooptical device according to claim 1, further comprising:
    a second semiconductor sensor that is different from the first semiconductor sensor, wherein:
    the second semiconductor sensor includes a third sensor element, a fourth sensor element, and a second electrode;
    the third sensor element and the fourth sensor element of the second semiconductor sensor are disposed along the first semiconductor sensor;
    the second electrode electrically connects the third sensor element and the fourth sensor element in series; and
    the first semiconductor sensor and the second semiconductor sensor are connected in parallel.

14. The electrooptical device according to claim 1, wherein:
    the first semiconductor sensor and the first signal lines are provided between the driving circuit and an outer edge of one side of the display region that opposes the driving circuit; and
    the first signal lines are arranged to have at least two wiring pitches, one of which has a first interval, and the other of which has a second interval narrower than the first interval.

15. The electrooptical device according to claim 14, wherein at least one of the first sensor element and the second sensor element is disposed in the first interval.

16. An electrooptical device comprising:
    a plurality of first signal lines that extend in a first direction within a display region on one surface of a first substrate;
    a plurality of second signal lines that extend in a second direction intersecting with the first direction within the display region on the one surface of the first substrate;
    pixel electrodes that are provided corresponding to intersections between the first signal lines and the second signal lines on the one surface of the first substrate; and
    a first semiconductor sensor that is provided on the one surface of the first substrate, wherein:
    the first semiconductor sensor includes a first sensor element, a second sensor element and a first electrode;
    the first electrode electrically connects the first sensor element and the second sensor element;
    the first sensor element and the second sensor element are each a diode element connected in series by the first electrode;
    the first semiconductor sensor is disposed along at least a side positioned on one side of the display region in the first direction, such that the first sensor element and the second sensor element are disposed along the one side of the display region;

a part of the first signal line overlaps with the diode element in a plan view;

a transistor is formed on the first substrate, the transistor including a sensor semiconductor layer which is on the same layer as a semiconductor layer constituting the diode element; and a part of the first signal line is configured with a conduction layer other than a conduction layer constituting a gate electrode disposed on a gate insulation layer in the transistor.

17. An electronic apparatus comprising:
the electrooptical device according to claim 16.

* * * * *